United States Patent
Freiin von Kapri et al.

(10) Patent No.: US 10,027,920 B2
(45) Date of Patent: Jul. 17, 2018

(54) TELEVISION (TV) AS AN INTERNET OF THINGS (IOT) PARTICIPANT

(71) Applicant: SAMSUNG ELECTRONICS CO., LTD., Suwon-si, Gyeonggi-do (KR)

(72) Inventors: Anette Freiin von Kapri, San Francisco, CA (US); Yun Zhou Wu, San Francisco, CA (US); Sigurdur Adalgeirsson, San Francisco, CA (US); Kristen Kator, San Francisco, CA (US); JaeWoo Chung, San Francisco, CA (US); Henry Holtzman, San Francisco, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 91 days.

(21) Appl. No.: 15/087,813

(22) Filed: Mar. 31, 2016

(65) Prior Publication Data
US 2017/0048476 A1    Feb. 16, 2017

Related U.S. Application Data

(60) Provisional application No. 62/203,847, filed on Aug. 11, 2015.

(51) Int. Cl.
| H04H 60/33 | (2008.01) |
| H04N 5/44 | (2011.01) |
| H04N 21/436 | (2011.01) |
| H04N 21/442 | (2011.01) |
| H04W 4/70 | (2018.01) |

(52) U.S. Cl.
CPC ..... *H04N 5/4403* (2013.01); *H04N 21/43615* (2013.01); *H04N 21/442* (2013.01); *H04W 4/70* (2018.02); *H04N 2005/4444* (2013.01)

(58) Field of Classification Search
CPC combination set(s) only.
See application file for complete search history.

(56) References Cited

U.S. PATENT DOCUMENTS

| 9,000,896 B1 | 4/2015 | Kim et al. | |
| 2012/0069246 A1* | 3/2012 | Thornberry | G08B 15/002 348/730 |
| 2013/0173621 A1 | 7/2013 | Kapoor et al. | |

(Continued)

OTHER PUBLICATIONS

Lin, N. et al., "The Research on Internet of Things Application Architecture Based on Web", Proceedings of the 2014 IEEE Workshop on Advanced Research and Technology in Industry Applications (WARTIA'14), Sep. 29-30, 2014, pp. 184-187, IEEE, United States.

(Continued)

*Primary Examiner* — Mulugeta Mengesha
(74) *Attorney, Agent, or Firm* — Sherman IP LLP; Kenneth L. Sherman; Steven Laut

(57) ABSTRACT

A method and device for a television (TV) device participating in an Internet of Things (IoT) network. An IoT controlling service is communicated with to send and receive messages adjusting a state of the TV device. The state of the TV device is monitored based on an attribute table. The state of the TV device can serve as triggers for one or more routines. A predefined routine is determined based on an actions table. The predefined routine is activated based on a detected TV device state attribute.

20 Claims, 34 Drawing Sheets

(56) References Cited

U.S. PATENT DOCUMENTS

| | | | |
|---|---|---|---|
| 2014/0047487 A1* | 2/2014 | Guedalia | H04N 21/43615 |
| | | | 725/80 |
| 2014/0244833 A1 | 8/2014 | Sharma et al. | |
| 2014/0359131 A1 | 12/2014 | Seed et al. | |
| 2015/0185713 A1 | 7/2015 | Glickfield et al. | |
| 2015/0199610 A1 | 7/2015 | Hershberg | |
| 2015/0201022 A1 | 7/2015 | Kim et al. | |
| 2015/0201035 A1 | 7/2015 | Profit et al. | |
| 2015/0227207 A1 | 8/2015 | Winter et al. | |
| 2015/0237071 A1 | 8/2015 | Maher et al. | |

OTHER PUBLICATIONS

Egger, S. et al., "Waiting Times in Quality of Experience for Web Based Services", Proceedings of the 2012 Fourth International Workshop on Quality of Multimedia Experience (QoMEX), Jul. 5-7, 2012, pp. 86-96, IEEE, United States.

* cited by examiner

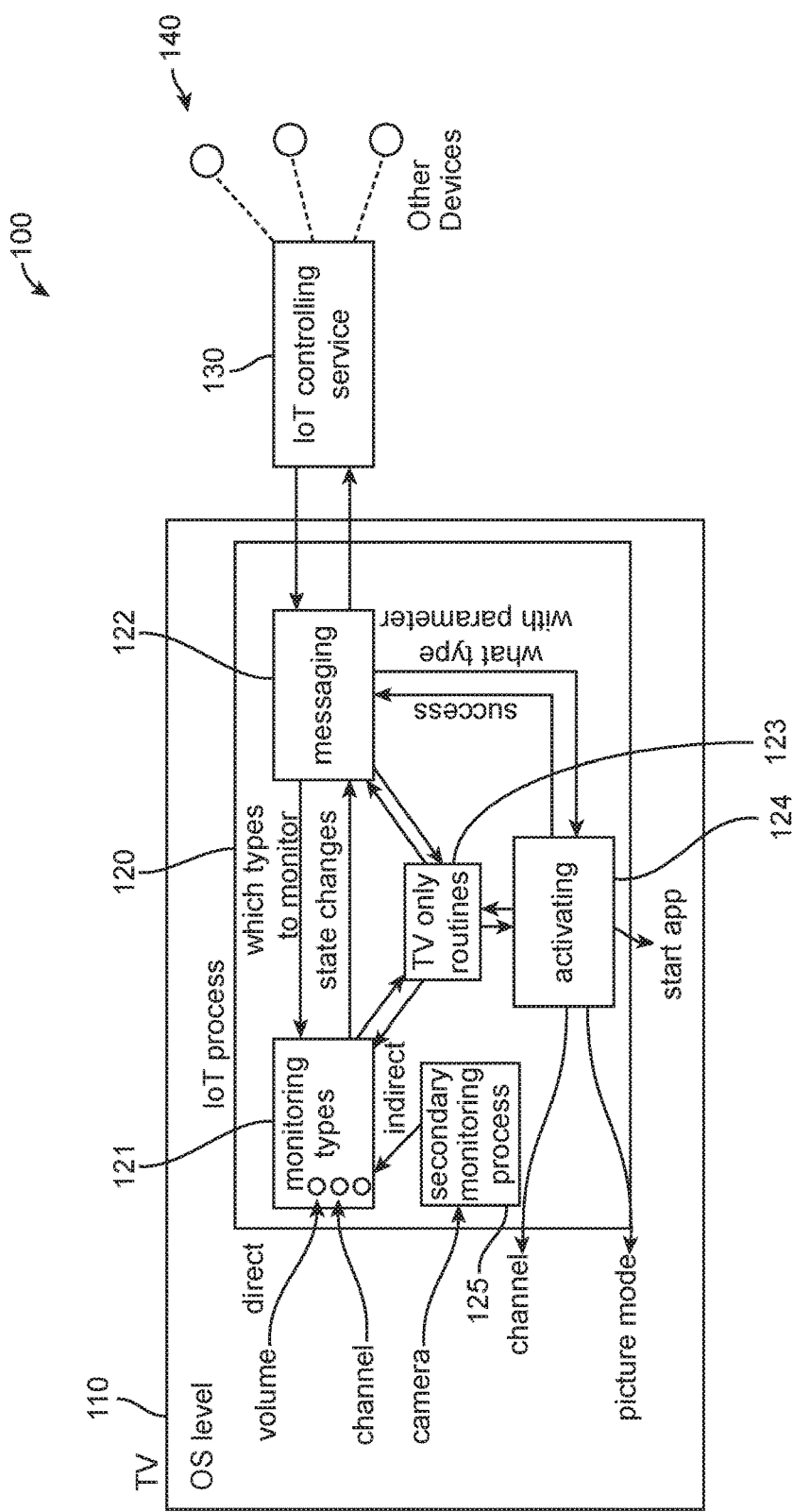

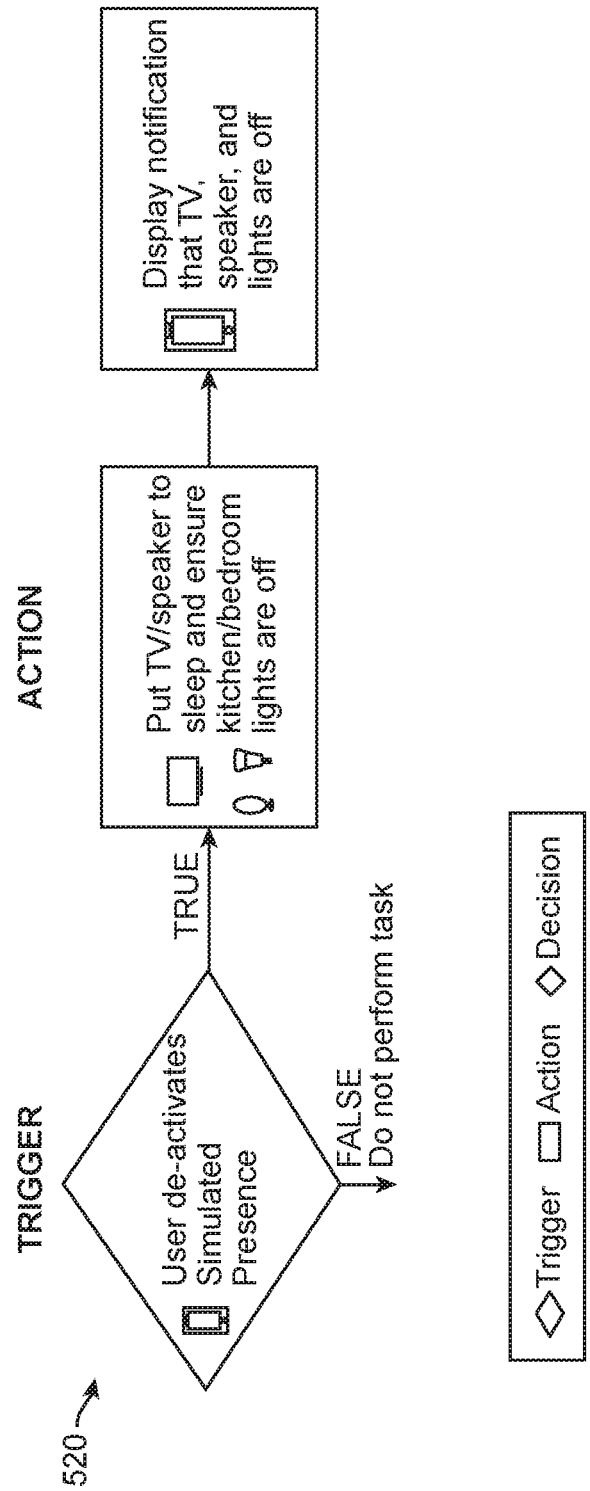

TELEVISION (TV) AS AN INTERNET OF THINGS (IOT) PARTICIPANT

CROSS-REFERENCE TO RELATED APPLICATIONS

This application claims the priority benefit of U.S. Provisional Patent Application Ser. No. 62/203,847, filed Aug. 11, 2015, incorporated herein by reference in its entirety.

TECHNICAL FIELD

One or more embodiments generally relate to an active television (TV) for Internet of Things (IoT) automations.

BACKGROUND

IoT uses existing Internet infrastructure to provide connectivity of objects or "things," such as computing devices, physical devices (e.g., vehicles, buildings, etc.) and groups of devices that may include electronics, sensors and networking capability. The "things" may be connected with an on and off switch to the Internet, and to one another. Connected "things" in an IoT network may act together to pass data amongst the network and to act together for automation, such as smart thermostat systems.

SUMMARY

Various embodiments generally relate to a television (TV) device participating in an Internet of Things (IoT) network. In one embodiment, a method includes an IoT controlling service that is communicated with to send and receive messages adjusting a state of the TV device. The state of the TV device is monitored based on an attribute table. The state of the TV device can serve as triggers for one or more routines. A predefined routine is determined based on an actions table. The predefined routine is activated based on a detected TV device state attribute.

In another embodiment, an apparatus includes a memory configured to store device state attributes and actions. A TV device is configured to participate in an IoT network to perform actions and routines based on the stored device state attributes and actions. Operation states of the TV device are configured as triggers for the actions and routines. The TV is configured to determine a predefined routine based on the stored actions, and to activate the predefined routine based on a detected TV device state attribute.

One embodiment includes a non-transitory computer-readable storage medium embodied thereon instructions being executable by at least one processor to perform a method for a TV device participating in an IoT network. The method including communicating with the IoT controlling service to send and receive messages adjusting state of the TV device. The state of the TV device is monitored based on an attribute table. The state of the TV device is used as triggers for routines. A predefined routine is determined based on an actions table. The predefined routine is activated based on a detected TV device state attribute.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 1 shows an example view of a TV device configured to participate with an IoT controlling service, according to an embodiment;

FIGS. 5A-C show an exemplary flow diagram for remote activation for simulated presence, according to an embodiment;

DETAILED DESCRIPTION

Figure 2A:
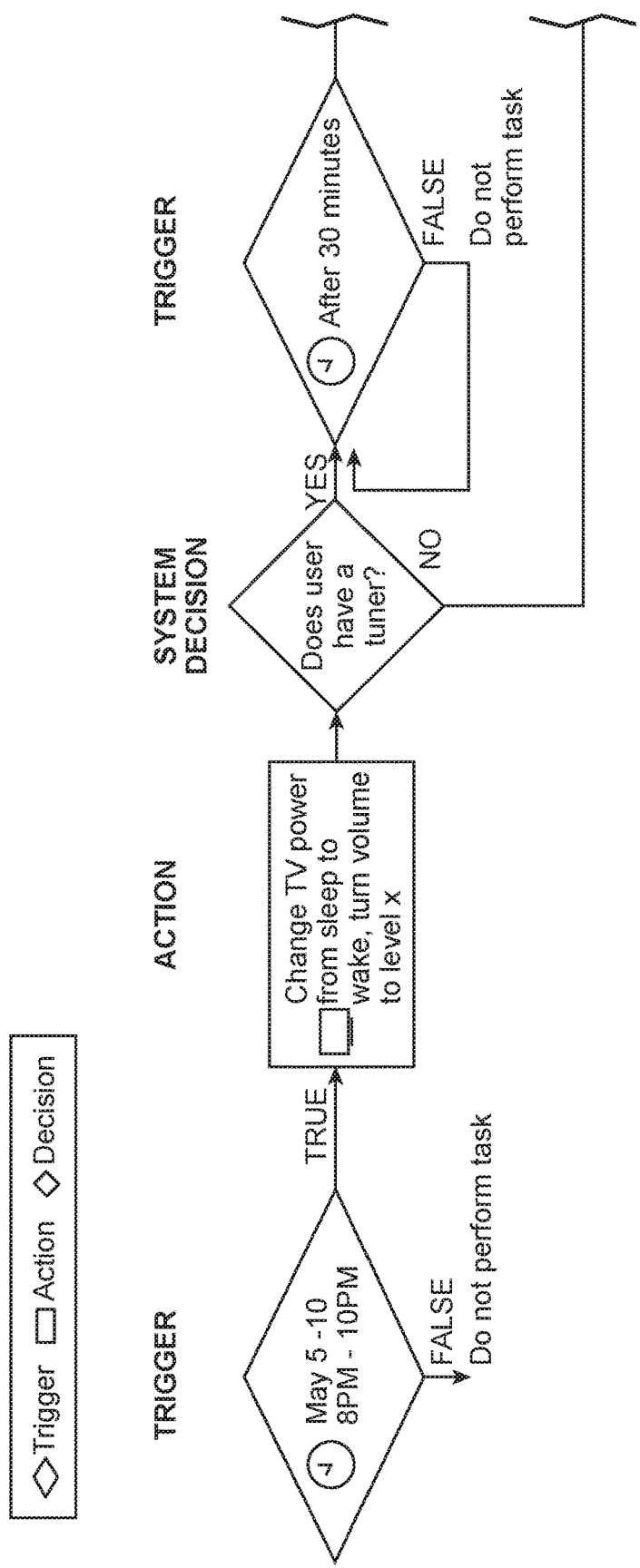
FIGS. 2A-B show an exemplary flow diagram for a TV only simulated presence, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments relate to TV participation in an Internet of Things (IoT) network. Capabilities and actions that a TV can sense or perform may be projected into a larger ecosystem of connected devices. In one embodiment, a method includes an IoT controlling service that is communicated with to send and receive messages adjusting state of the TV device. The state of the TV device may be monitored based on an attribute table. The state of the TV device can serve as triggers for routines. A predefined routine may be activated based on a detected TV device state attribute determined utilizing an actions table.

In one or more embodiments, the TV does not only act as a display to the IoT home or network, but becomes a part of the IoT ecosystem. The TV is a device that can sense presence and initiate or carry out actions. In one example, monitoring state capabilities of the TV are maintained in an attributes table and actions are maintained in the actions table. Integrating a TV having IoT functionality into a larger IoT ecosystem makes the TV a more powerful component and opens new scenarios around entertainment, security, daily routines, etc. IoT functionality for the TV may encompass a particular set of capabilities that are not designed to be independent from any other device, but rather support and enhance a larger cloud of devices in a smart environment, such as a home environment.

FIG. 1 shows an example view 100 of a TV device 110 configured to participate with an IoT controlling service 130, according to an embodiment. The television may include circuitry or instructions for a processor to perform various IoT processes using the IoT process 120. The IoT process 120 provides control system level parameters, tracks TV state, sends messages to the IoT controlling service 130, receives messages from the IoT controlling service 130, acts on messages, saves settings, runs subtasks, etc. In one example, the IoT process 120 includes a monitoring component 121, messaging component 122, secondary monitoring component 125, a TV only routines component 123 and an activating component 124. The IoT controlling service 130 may either be implemented in a cloud computing environment, a separate hub, an IoT hub integrated into the TV, etc. The IoT controlling service is connected with other devices 140 (e.g., smart devices, computing devices, physical devices (e.g., vehicles, buildings, etc.) and groups of devices that may include electronics, sensors and networking capability, etc.). The communication between the IoT process 120 and the IoT controlling service 130 may be provided through a wired or wireless connection (e.g., Wi-Fi, terrestrial microwave, cellular, IEEE 802.16, WIMAX, etc.).

In one embodiment, the monitoring component types may include direct monitoring types 121 and indirect monitoring types 125 for monitoring TV device 110 features. In one example, the direct monitoring types may include volume state (i.e., volume level or muting selection) and channel state (current channel selected). In another example, direct monitoring types may include monitoring of other types, such as other TV device 110 features (e.g., functional displays: program guide, recording list, etc.). In one example, the indirect types may include a camera type or microphone type that is monitored by the secondary monitoring process 125. Other indirect types may include other indirect TV device 110 features, such as apps (e.g., Internet search, e-mail, chat, social platform apps, etc.). In one example, the TV device 110 may include a motion sensor/detector for sensing movement in front of the TV device 110. In this example, sensed motion may be included in the indirect types.

In one embodiment, the messaging component 122 may communicate with the monitoring component 121 to provide information regarding which monitoring types to monitor for state or change in state. The monitoring component 121 communicates with the messaging component 122 to inform state changes for the monitored types.

In one embodiment, the activating component 124 may cause activation of changes to the TV device 110 by activating or changing operating system (OS) level functions, such as changing of channel, setting picture mode, starting/exiting a TV app, etc. In one example, the activating component 124 communicates with the messaging component 122 to send success/failure confirmation information, and receive the monitored type and parameter for changing state of a feature for the TV device 110. In one example, the parameter may include numbers, sources, commands, etc.

In one embodiment, the IoT controlling service 130 communicates with the messaging component 122 by sending which TV states to monitor and to stop monitoring, what TV actions to perform, possible TV only routines (i.e., no other IoT connected devices) to execute, etc. The IoT controlling service 130 further communicates with the messaging component 122 by receiving success or error messages relating to performance of actions, and state changes of monitored TV states.

In some embodiments, processing may be included in the IoT process 120 that saves TV only routines to prevent latency issues for routines that only sense and trigger TV functionality.

In one embodiment, an attribute table may be utilized to determine the state of the TV device 110 as it senses its own state and monitors for specific attributes. Table 1 below is an example TV attributes table that includes attribute identification (ID), type, details, parameter, description, and related routine or smart app. The attribute table can include various categories such as a default or general state category. The attributes can be used as triggers for any IoT routine. Additional categories can focus on user specific states or content specific states. The states may be linked to a related routine (e.g., an executable program, process or function). For example, a routine can include a trigger for user engagement, where if a user is not engaged (e.g., speaking on the phone, getting up to go perform some other task, etc.) the current content would be paused. The TV device 100 may run the routine when a state change to disengaged occurs based on received input from sensors.

TABLE 1

| ID | Type | Detail | Parameter | Description | Related Routine/ Smart App |
|---|---|---|---|---|---|
| Default | | | | | |
| TA01 | Channel | Channel Changed to | Number | Function Mapped to RC's Channel; Note TV cannot change channel on set-top-box | |
| TA02 | Volume | Volume Changed to | Number (0 = mute) | Function mapped to RC's volume and mute | Map volume to any speakers that are connected to the TV |
| TA03 | Input Source | Input Source Changed to | Source (e.g., HDMI 1, HDMI2, etc.) | Function mapped to RC's source change | |
| TA04 | Playback | Playback type Changed to | Play | Pause | Stop | Function mapped to RC's playback control | Dim or Lighten up Lights based on Playback Status |
| TA05 | Power | Power State of TV Changed to | Wake | Sleep | Function mapped to RC's power | |
| User Specific | | | | | |
| TB01 | TV Motion Sensor | Movement in front of TV | Yes | No | Movement is detected in front of TV | |
| TB02 | User Engagement | User engagement with TV content | Engaged | Disengaged | Re-Engaged | User stops/starts paying attention to TV content | Lower volume if users are less engaged |
| TB03 | User Audio Level | Audio level in front of TV | Number | Ambient room audio changes above threshold. For example when a group of people start talking, pause content. Doesn't need to recognize conversation, only detect ambient noise level | Security System, Baby Watch |

In one embodiment, the TV device 110 may use a table for actions to determine the appropriate response in a scenario. The actions may be related to a specific scenario the TV device 110 may perform as an IoT device. Tables 2A (default) and 2B (advanced) illustrates exemplary actions tables. In one example, the actions table includes action ID, type, details, parameter, description, and related routine or smart app. The TV device 110 may include various configurable routines as part of the IoT ecosystem. Based on the triggers, various routines can be activated. Such routines can include, but are not limited to: security routines (e.g., simulated presence, security camera display/control), time of day or presence routines (e.g., morning, evening, return home, etc.), and entertainment (e.g., media viewing modes).

TABLE 2A

| ID Default | Type | Detail | Parameter | Description | Related Routine/ Smart App |
|---|---|---|---|---|---|
| AA01 | Channel | Set Channel To | Number | Function mapped to RC's channel | Simulated Presence |
| AA02 | Volume | Set Volume To | Number (0 = mute) | Function mapped to RC's volume and mute | |
| AA03 | Input Source | Set Input Source To | Source (e.g., HDMI 1, HDMI2, etc.) | Function mapped to RC's source change | Simulated Presence, Good Night |
| AA04 | Playback | Set Playback To | Play | pause | stop | Function mapped to RC's playback control | Phone Call During Movie |

TABLE 2A-continued

| ID Default | Type | Detail | Parameter | Description | Related Routine/ Smart App |
|---|---|---|---|---|---|
| AA05 | Power | Set Power State of TV To | Wake \| sleep | Function mapped to RC's power | Simulated Presence, Good Morning, Good Night, Warm Welcome, Gear Fit Health Summary |
| AA06 | Mode Change | Set Picture Mode To | Dynamic \| standard \| natural \| cinema | Based on current content change the picture mode to "cinema" for example | Cinema Mode |
| AA07 | Mode Change | Set Audio Mode To | Standard \| music \| cinema \| clear voice \| amplify | The audio mode is changed based on the content that is playing for the best experience | |
| AA08 | Open App | Open a certain App | e.g. Netflix \| Hulu \| HBO \| Pandora | Programmatically open an application that exists on the TV system | |

TABLE 2B

Advanced

| | | | | | |
|---|---|---|---|---|---|
| AB01 | Record Audio | Record Audio Clip from Mic | | Record audio clip from mic on TV (or RC) | Security System |
| AB02 | Record Video Clip | Record Video Clip from Camera | | Record video clip from TV camera | |
| AB03 | Stream Video | Play Video Stream on PNP | | Play video stream PnP. Possible security camera feed triggered by motion, or baby monitor camera when baby cries | Who's There?, Open Up!, Baby Watch |
| AB04 | Play Audio | Play Audio From a Clip | | Play audio clip from speakers | Good Morning |
| AB05 | Notification with Selection | Open Notification with Selection | | Show custom text notification that requires user's response with selection: Y or N, OK or Cancel. Ask user question with UI option response elements. Other IoT devices could elicit user input via TV. Respond section can be optional. The notification has an optional timeout with x seconds. | Who's There?, Open Up!, Baby Watch, Emergency Alert, Health Alert, Local Alerts, Good Night, Cinema Mode |
| AB06 | Parental Control | Set Parental Control To | On \| Off | | |
| AB07 | Parental Control | Set Parental Lock To | On \| Off | | |
| AB08 | Brightness Change | Change Brightness Level To | Percentage | The screen brightness level of the TV is changed | Good Morning |

Figure 2B:
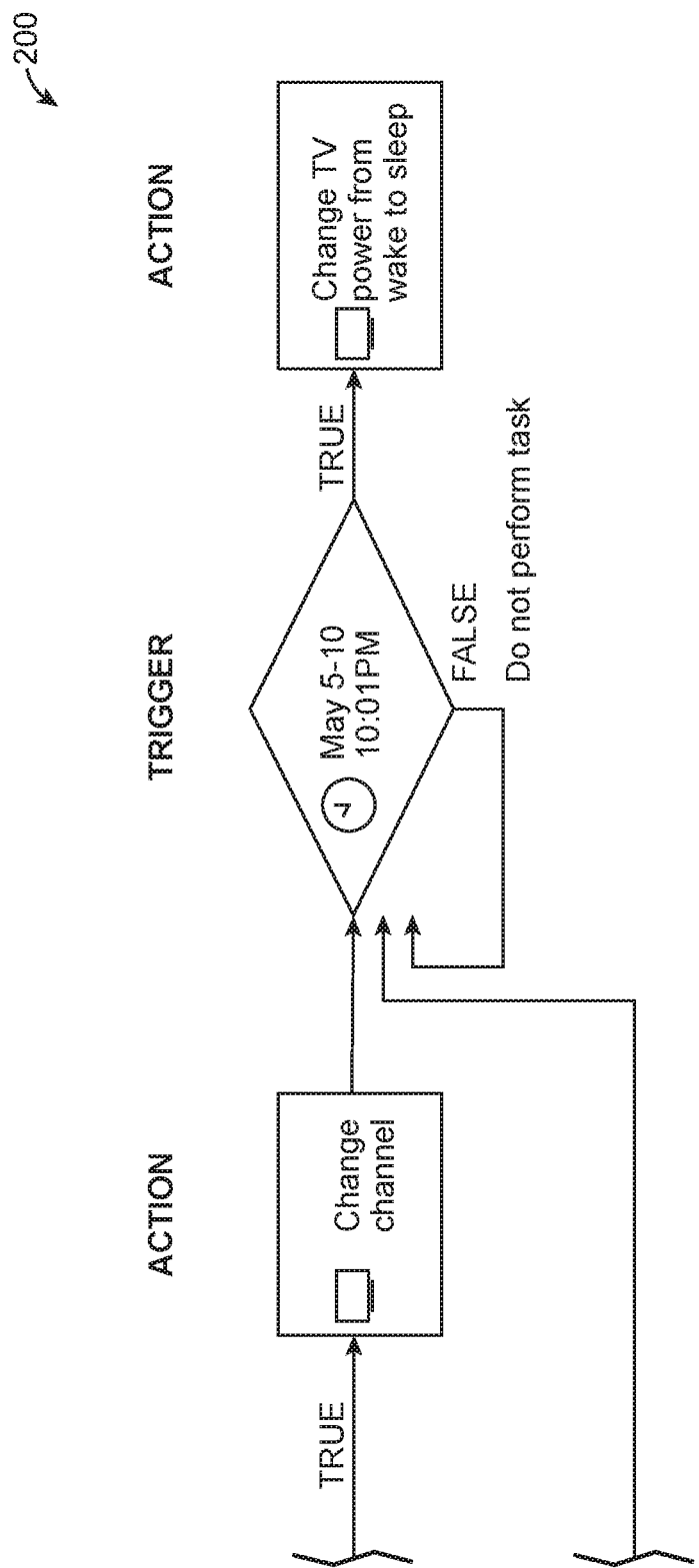

FIGS. 2A-B show an exemplary flow diagram 200 for simulated presence, according to an embodiment. The TV device 110 functions as part of the IoT network (e.g., IoT home network) to automatically operate to simulate a person being present to avoid indicating that a home is not unoccupied (e.g., for security reasons, etc.). The flow diagram 200 shows a scenario for simulated presence and coordination with various IoT elements, such as mobile devices, speakers, etc. In one example, when users are determined to not be home (e.g., based on lack of sensing of a person by the camera, lack of motion sensed by a motion sensor, no sounds sensed by the microphone, a setting set, etc.) at a certain time, the TV device 110 turns on and switches to a predefined channel. The volume may be set to a predetermined average watching volume. In one example, every now and then, the TV device 110 automatically changes the channel to simulate a person. The routine may stop after running for a few hours.

The example flow diagram 200 shows exemplary dates and times for ease of understanding. The triggers may be determination of certain time and date criteria, which may use the attributes from the attributes table, such as the example shown in Table 1. The routine determines whether a particular date (e.g., May 5-10) and time (e.g., 8 PM-10 PM) criteria has been met or not. If the date and time criteria are not met, the simulated presence routine is not performed. If the date and time criteria are met, the action is determined (e.g., using an action table, such as Tables 2A and 2B) based on the date and time criteria (e.g., change TV device 110 power from sleep to wake, turn volume to a particular level X). A determination is made whether the TV device 110 includes a tuner (e.g., the TV device 110 is not using a satellite set-top-box (STB) with a separate remote control device, etc.) or not. If it is determined that the TV device 110 includes a tuner, the routine proceeds to determine whether particular time interval criteria (e.g., after 30 minutes, etc.) have been met. If the particular time interval criteria have not been met, the routine loops back or waits until the criteria is met to proceed. Once the particular time interval criteria have been met, another action is performed (e.g., change channel of the TV device 110). If the TV device 110 is determined to not have a tuner, the routine determines whether another particular date and time criteria have been reached or not (e.g., May 5-10, 10:01 PM). If the particular date and time criteria has been reached, another action is performed (e.g., change TV device 110 power from wake to sleep). Otherwise, the routine proceeds to continue to determine whether the other date and time criteria has been met (as described above).

Figure 3A:
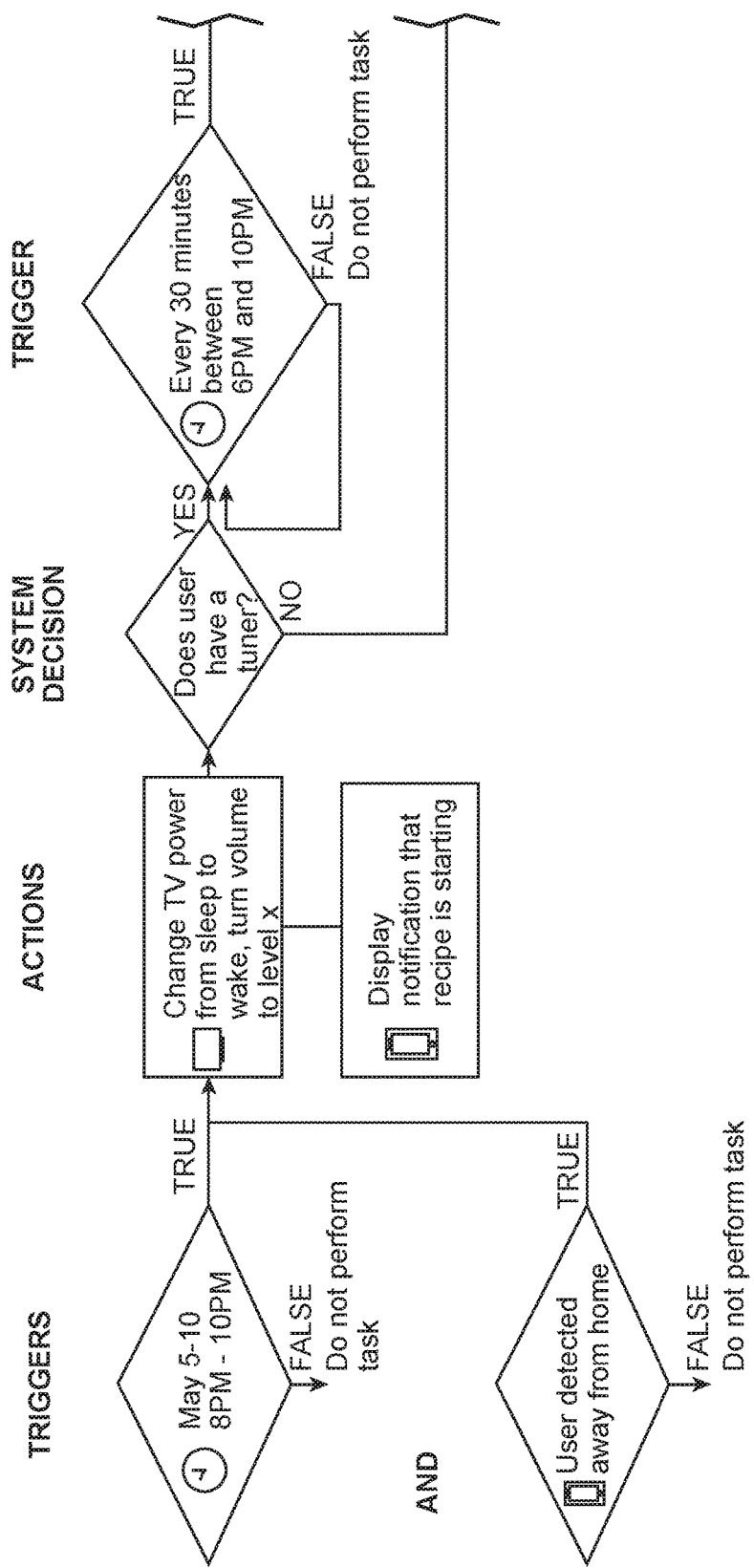
FIGS. 3A-B show an exemplary flow diagram for a TV and mobile device for simulated presence, according to an embodiment.
Figure 3B:
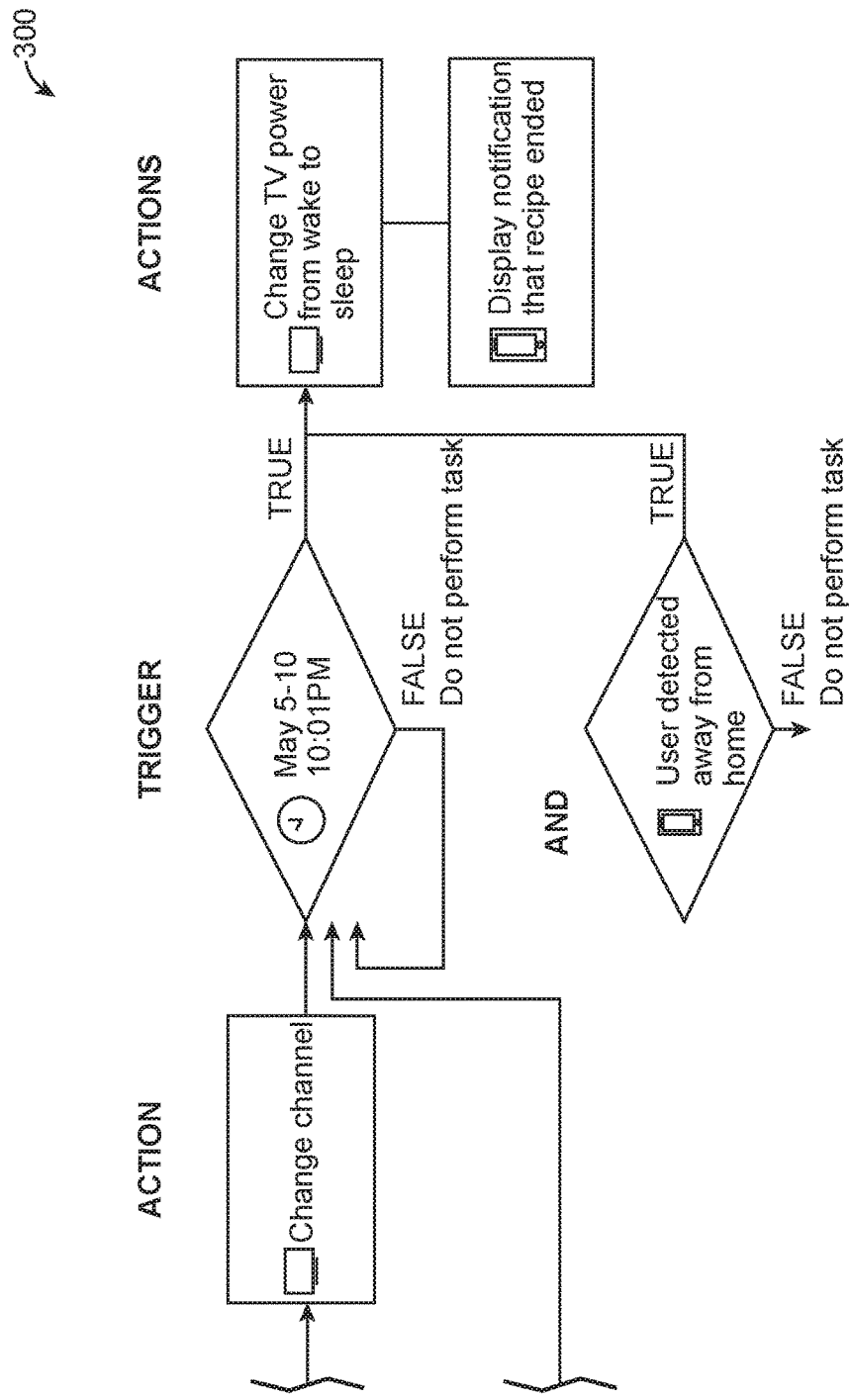

FIGS. 3A-B show an exemplary flow diagram 300 for simulated presence involving a TV device 110 and mobile device, according to an embodiment. In one example, when users are not home, the initial trigger may be absence of a user's mobile device and time the TV device 110 turns on and switches to a predefined channel. The volume is set to a particular average watching volume. Every now and then, the TV device 110 automatically changes the channel to simulate a person being in the home switching channels. The channel change may occur at varying times, which can include set time periods, random intervals between channel changes, etc. The routine stops after running for a few hours. Notifications about routine status appear (e.g., via text message, push notifications, email, etc.) on the mobile device. The example flow diagram 300 shows exemplary dates and times for ease of understanding. The triggers may be determination of certain time and date criteria, and whether a user is detected away from home (or other particular places, areas, etc.), which may use the attributes from the attributes table, such as the example shown in Table 1.

In one example, the routine determines whether a particular date (e.g., May 5-10) and time (e.g., 8 PM-10 PM) criteria and also whether a user is detected to be away from their home (or other local network, such as an office, etc.) have both been met or not. If both criteria are not met, the simulated presence routine is not performed. If both criteria are met, the actions are determined (e.g., using an action table, such as Table 2A or 2B) and it is determined to perform an action (e.g., change TV device 110 power from sleep to wake, turn volume to a particular level x and display a notification that the recipe/routine is starting) based on the date and time criteria and user away from home detection. It is determined if the TV device 110 includes (or is using) a tuner or not. If the TV device 110 does not include a tuner, the routine proceeds to determine whether another date and time criteria (e.g., May 5-10, 10:01 PM) and the user is detected away from home criteria are met yet. If both criteria have not been met, the routine loops back or waits until both criteria are met to proceed. Once both criteria have been met, other actions are performed (e.g., change TV device 110 power from wake to sleep and display a notification that the recipe/routine has ended). If the TV device 110 is determined to include a tuner, the routine determines whether a particular time and time interval criteria has been reached or not (e.g., 30 minutes between 6 PM and 10 PM, etc.). If the particular time and time interval criteria has been reached, another action is performed (e.g., change channel of the TV device 110). The routine then proceeds to determine whether the other date and time interval criteria and user detected away from home criteria have been met (as described above).

Figure 4A:
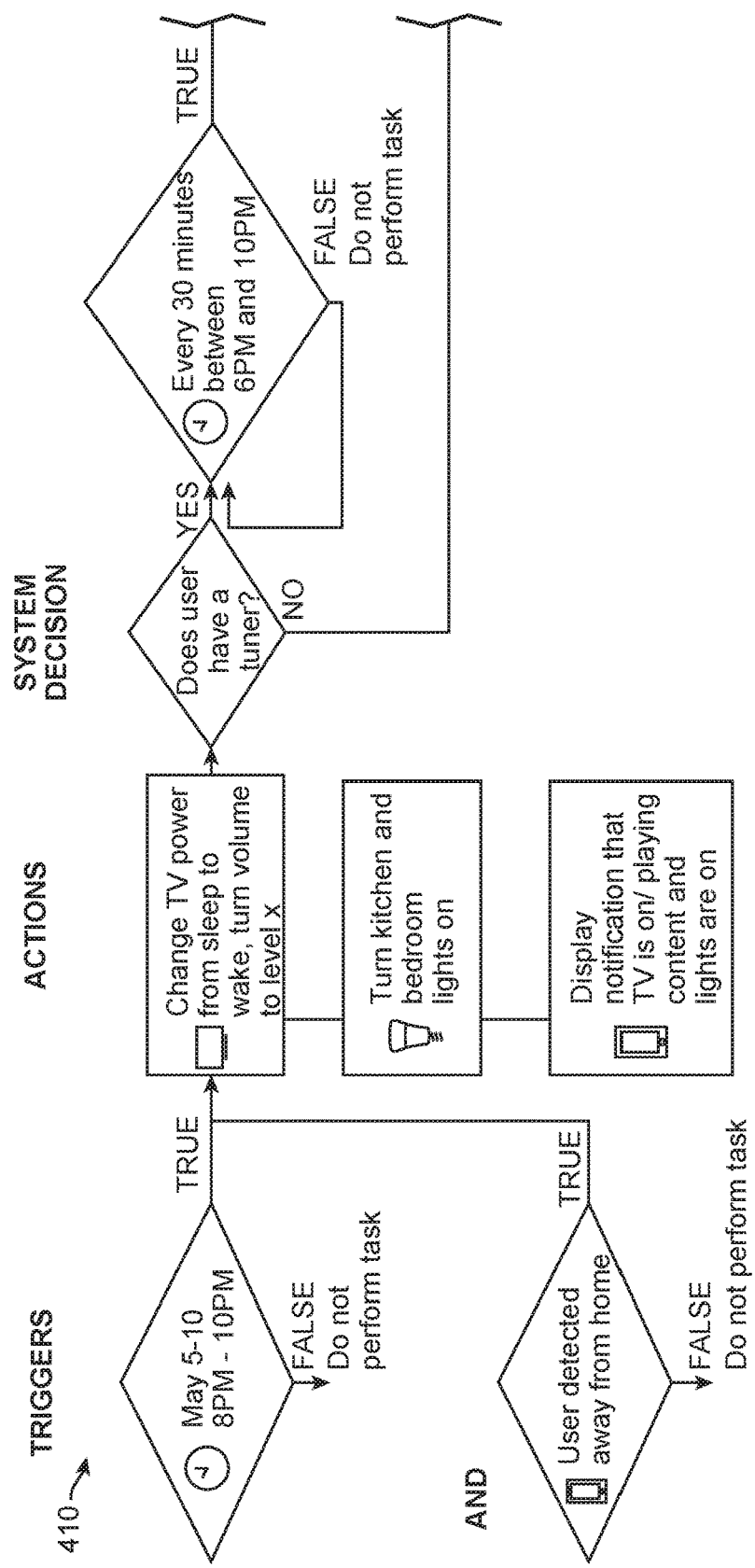
FIGS. 4A-B show an exemplary flow diagram for a TV and connected devices ecosystem for simulated presence, according to an embodiment.
Figure 4B:
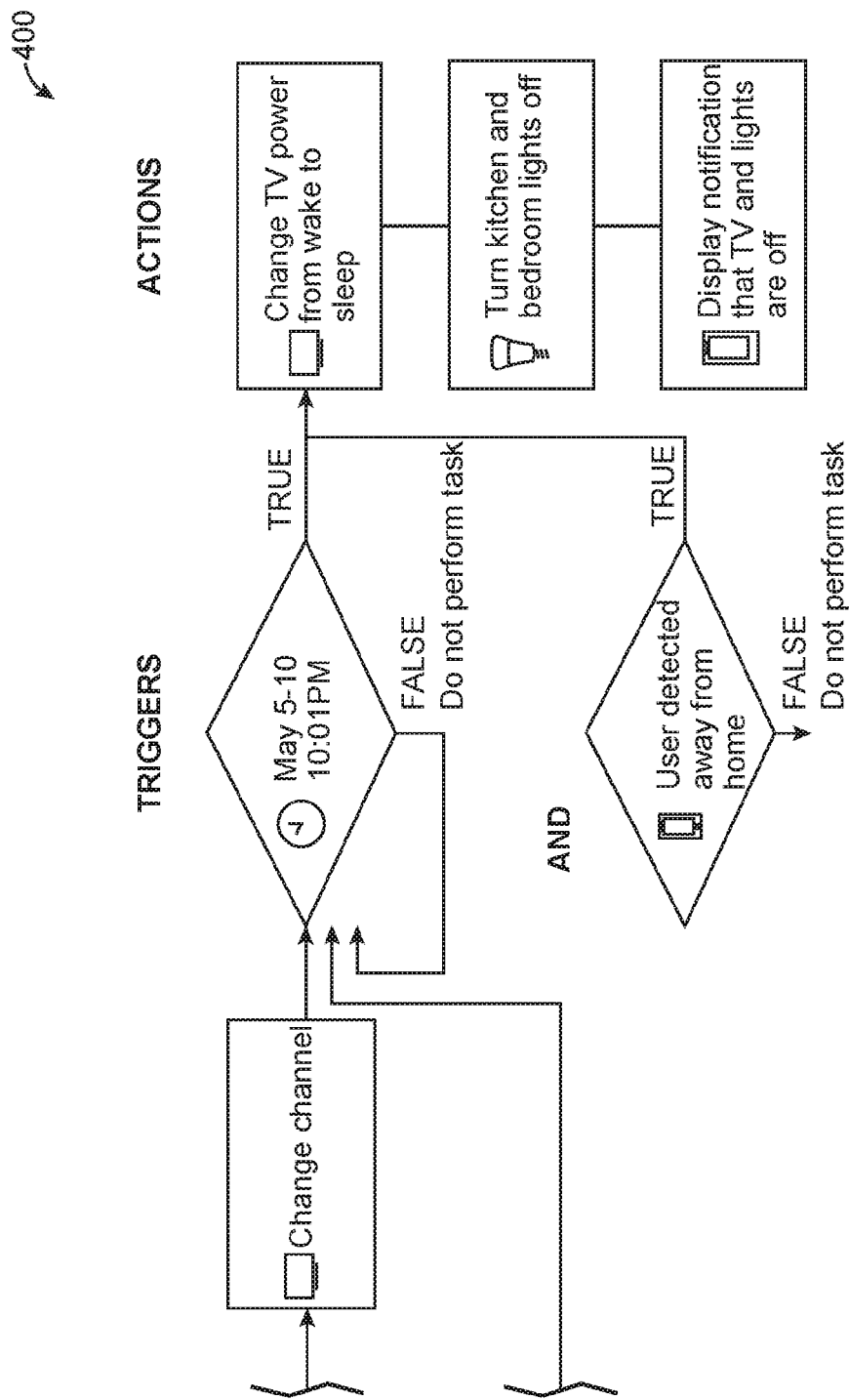

FIGS. 4A-B show an exemplary flow diagram 400 for simulated presence involving a TV device 110 and connected devices ecosystem for simulated presence, according to an embodiment. In this example, an initial trigger may be when users are not home determined by absence of a mobile device or a selected time period. Based on the trigger for presence, the TV device 110 turns on and switches to a predefined channel. The volume is set to average watching volume. Every now and then, the TV device 110 automatically changes the channel to simulate a person is home and changing channels. The speakers play music intermittently throughout the day to simulate a user turning on and off sound, lights turn on at certain time. The routine stops after running for a few hours. Notifications regarding routine status appear on the mobile device (e.g., via text message, push notifications, email, etc.).

The example flow diagram 400 shows exemplary dates and times for ease of understanding. The triggers may include determination of certain time and date criteria, and whether a user is detected away from home (or other particular places, areas, etc.), which may use the attributes from the attributes table, such as the example shown in Table 1. The routine determines whether a particular date (e.g., May 5-10) and time (e.g., 8 PM-10 PM) criteria and also whether a user is detected to be away from their home (or other local network, such as an office, etc.) have both been met or not for the TV device 110 and other devices' (e.g., kitchen lights and bedroom lights) simulated presence flow 410.

In one example, for the TV device 110 and other devices simulated presence flow 410, if both criteria (particular date and time, and whether a user is detected to be away from their home) are not met, the simulated presence routine is not performed. If both criteria are met, the actions are determined (e.g., using an action table, such as Table 2A or Table 2B) and it is determined to perform actions (e.g., change TV device 110 power from sleep to wake, turn volume to a particular level x, turn kitchen and bedroom lights on and display a notification that the TV device 110 is powered on and playing content and the kitchen and bedroom lights are turned on). It is determined whether the TV device 110 includes a tuner or not. If the TV device 110 includes a tuner, the routine proceeds to determine whether another date and time criteria (e.g., May 5-10, 10:01 PM) and the user is detected away from home criteria are met yet. If both criteria have not been met, the routine loops back or waits until both criteria are met to proceed. Once both criteria have been met, other actions are triggered to be performed (e.g., change TV device 110 power from wake to sleep and display a notification that the TV device 110 is powered off). If the TV device 110 is determined to be connected to a tuner, the routine determines whether a particular time and time interval criteria has been reached or not (e.g., between 6 PM and 10 PM and every 30 minutes, etc.). If the particular time and time interval criteria has been reached, another action is triggered to be performed (e.g., change channel of the TV device 110). Upon a determination that the TV device 110 does not include a tuner or the other action was performed after the particular time and time interval criteria were met, the routine proceeds to determine the criteria of whether the other date and time interval criteria and user detected away from home criteria have been met. If the criteria have been met, other actions are determined and performed (e.g., change TV device 110 power from wake to sleep, turn kitchen and bedroom lights off, display a notification that the TV device 110, kitchen lights and bedroom lights are off). Otherwise, the routine continues to check the criterion before proceeding.

Figure 5A:
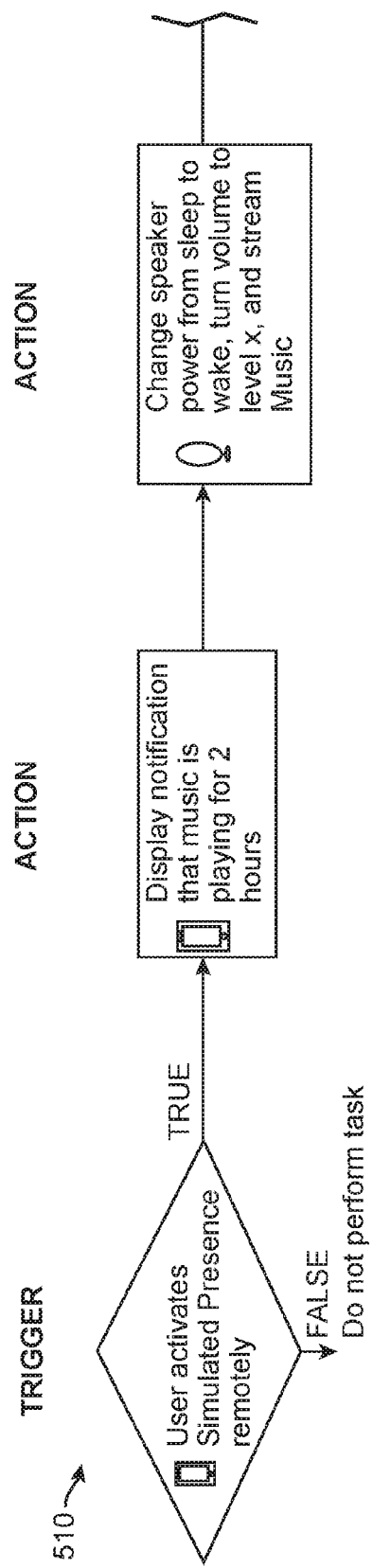
Figure 5B:
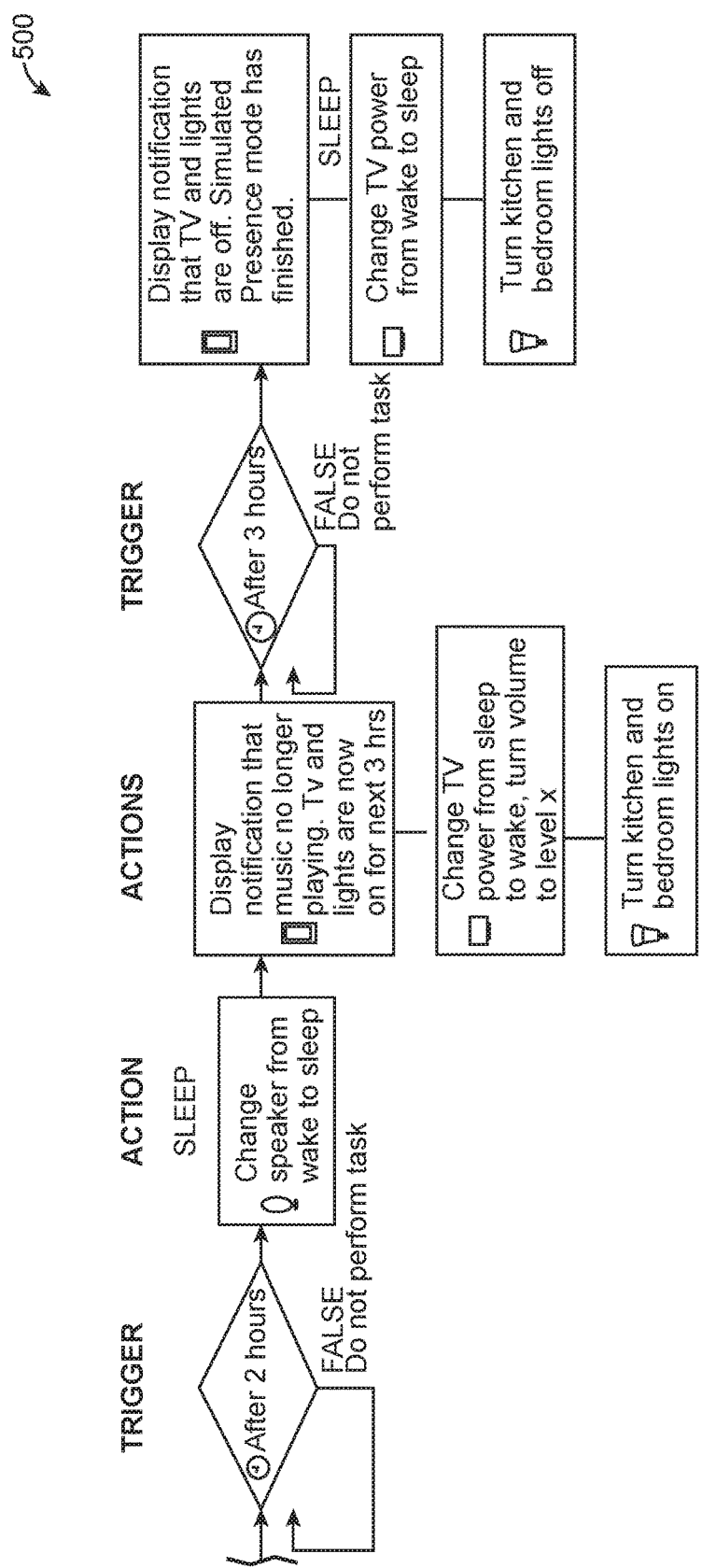

FIGS. 5A-C show an exemplary flow diagram 500 for remote activation for simulated presence, according to an embodiment. In one example, when users are not home, they can use their mobile device to launch a simulated presence routine. The speaker device (or sound system) turns on and plays music for two hours. After two hours, the speaker device stops playing and the TV device 110 and lights switch on. The TV device 110 volume is set to average watching volume. The routine stops after running for a few hours. Notifications regarding routine status appear on the mobile device (e.g., via text message, push notifications, email, etc.). The user can choose to stop the routine at any moment from the mobile device.

In one example, the triggers for the routine may include the mobile device remotely sending a signal or instruction to activate or deactivate the simulated presence routine. In one example, the flow diagram 500 includes simulated presence flow 510 for activation and flow 520 for deactivation.

In one example, the simulated presence routine activation flow 510 begins by receiving an activation signal or instructions from a mobile device (e.g., by the TV device 110 or the IoT controlling service 130). If the activation signal or instruction is received, a first action is determined (e.g., using the actions table, such as actions Table 2A or 2B) and performed (e.g., display notification that music is playing for two hours), and a second action is determined and performed (e.g., change speaker device power from sleep to wake, turn volume to a particular level x, and stream music). It is then determined whether a time interval criterion has been met or not (e.g., 2 hours has elapsed). If the time interval criterion has not been met, the routine proceeds to loop back or wait until the time interval criterion is met. If the time interval criterion is met, the routine proceeds to perform an action (e.g., change the speaker device state from wake to sleep) and performs other actions (e.g., display a notification that the music is no longer playing, and the TV device 110 and kitchen and bedroom lights are turned on; change TV device 110 power from sleep to wake, turn volume to a particular level x, turn on kitchen and bedroom lights). The routine then checks if another particular time interval criterion (e.g., after 3 hours has elapsed) has been met. If the other particular time interval criterion is met, the routine performs actions (e.g., display a notification that the TV device 110, kitchen and bedroom lights are off, and the simulated presence routine has finished; change TV device 110 power from wake to sleep; and turn kitchen and bedroom lights off). If the other particular time interval criterion is not met, the routine maintains its status and continues to check the criterion until it is met.

In one example, the simulated presence routine deactivation flow 520 begins by receiving a deactivation signal or instructions from a mobile device (e.g., by the TV device 110 or the IoT controlling service 130) as a trigger. If the deactivation signal or instruction is received, a first action is determined and performed (e.g., change TV device 110 from wake to sleep and/or speaker device power from wake to sleep, turn kitchen and bedroom lights off) and a second action is determined and performed (e.g., display notification that the TV device 110 and/or speaker device, kitchen lights and bedroom lights are off).

Figure 6:
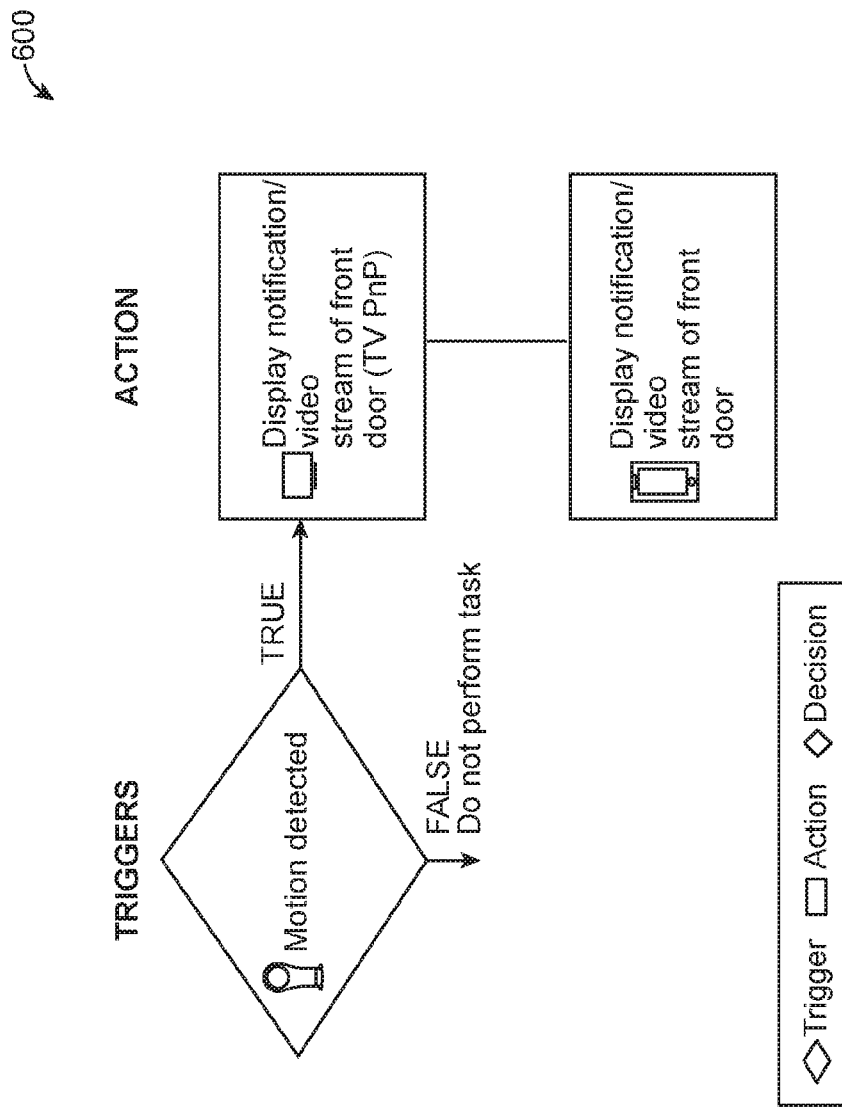
FIG. 6 shows an exemplary flow diagram for displaying security camera feed based on motion detection, according to an embodiment.

FIG. 6 shows an exemplary flow diagram 600 for displaying security camera feed based on motion detection, according to an embodiment. In one example, a security camera feed can be viewed on the TV device 110 screen as a picture in picture (PnP) display, which can be triggered by unusual motion (e.g., sensed by a camera or optional motion sensor placed at a particular location, e.g., a front door etc.) or activity (sensed by camera or microphone). With a mobile device, users can view the video feed on the mobile device remotely.

In one example, the trigger for the routine may include sensing motion. The routine determines whether motion is detected or not. If motion is not detected, the routine does not perform any actions and loops back or waits until motion is detected. If motion is detected, then a first action is determined (e.g., using the actions table, such as actions Table 2A or 2B) and performed (e.g., display notification and/or a video stream from a camera (e.g., a front door, etc.) as a PnP on the TV device 110 and a second action is performed (e.g., display a notification and/or a video stream from a camera (e.g., a front door, etc.) on a mobile device.

Figure 7A:
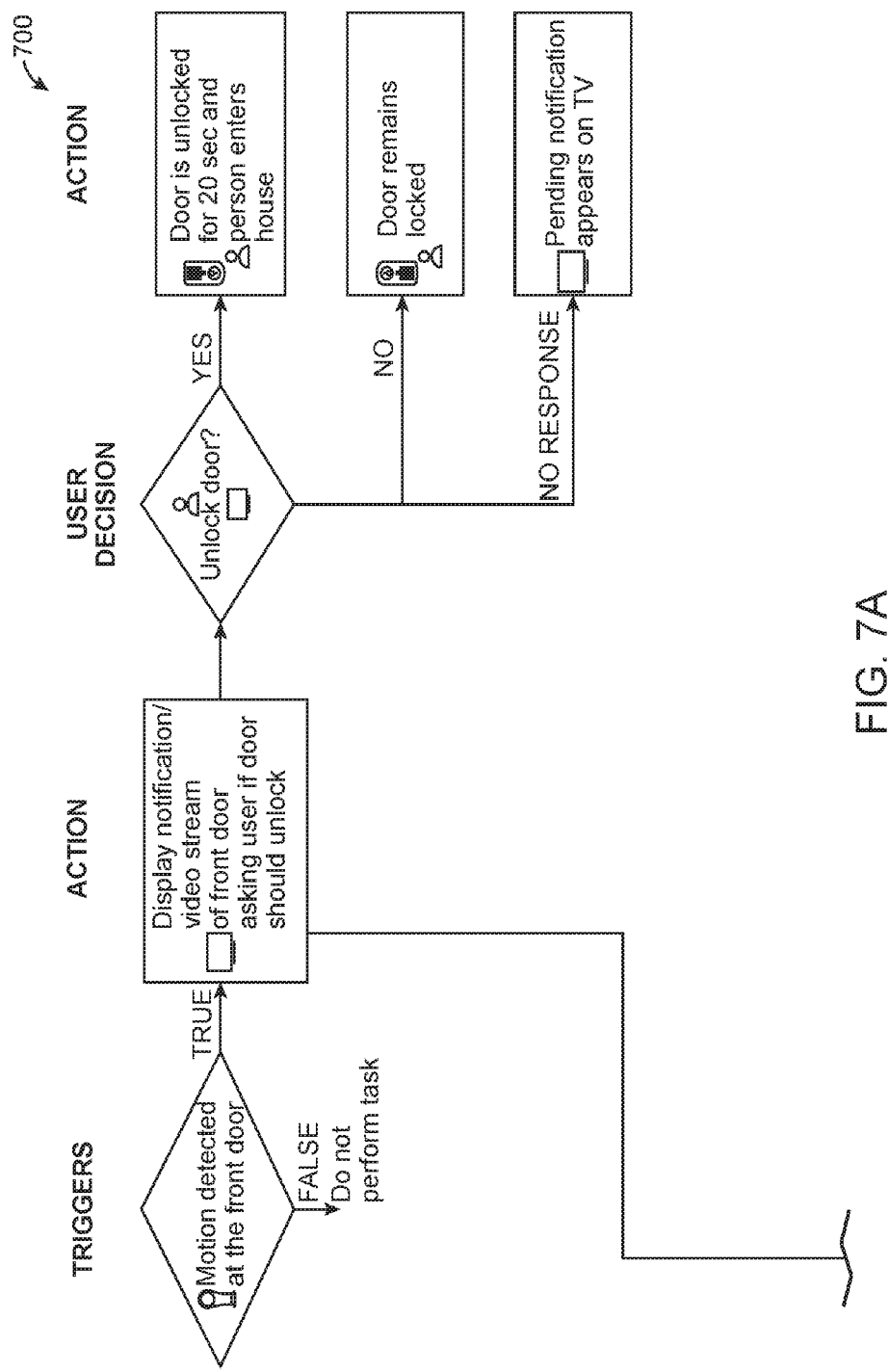
FIGS. 7A-B show an exemplary flow diagram for remote access with TV and connected devices, according to an embodiment.
Figure 7B:
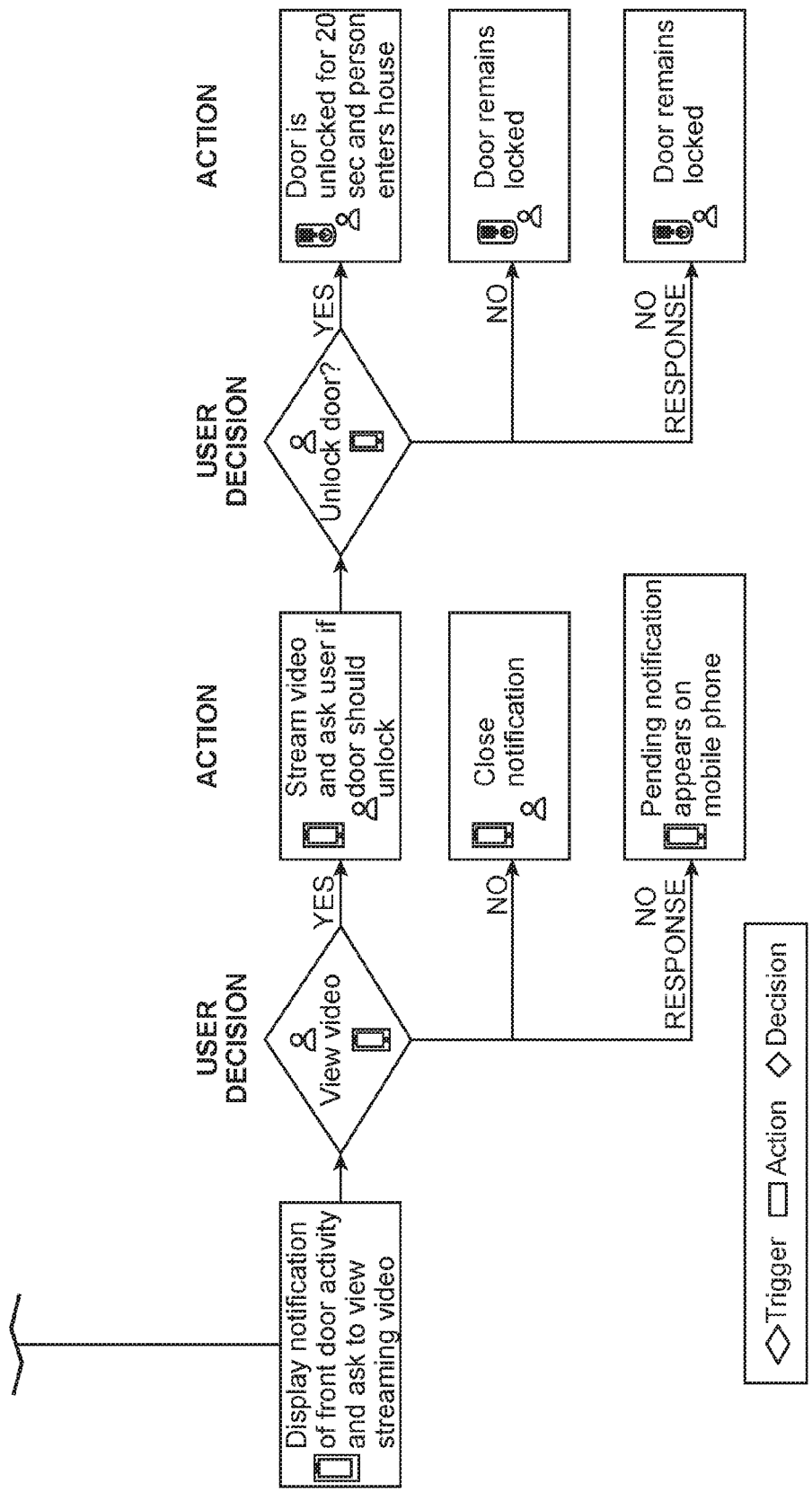

FIGS. 7A-B show an exemplary flow diagram 700 for remote access with TV and connected devices, according to an embodiment. In one example, a security camera at a particular location (e.g., a front door) can be used in combination with a smart lock. Notification on the TV device 110 or a mobile phone is provided to show a subject that triggered the motion detection. A user can remotely open the door using a smart lock device (e.g., send signals over the Internet to a network connected smart lock). In one example, the trigger for the routine may include sensing motion.

In one example, the flow diagram 700 begins by determining whether motion is detected at a particular place (e.g., a front door) or not. If motion is not detected, the routine loops back or waits until motion is detected. If motion is detected at the particular place, then a first action is determined (e.g., using the actions table, such as actions Table 2A or 2B) and performed (e.g., display notification asking whether the smart lock should be unlocked or not and/or display a video stream from a camera (e.g., a front door, etc.) as a PnP on the TV device 110 and a second action is performed (e.g., display a notification of front door activity and ask whether a video stream from a camera should be displayed or not on a mobile device). If a signal or instruction is received (e.g., by the TV device 110) to unlock the smart lock (e.g., the front door lock), an action is performed to unlock the smart lock (e.g., for a particular time, such as 20 seconds, etc.). If a signal or instruction is received to not open the smart lock, the door remains locked. If no response to the query of whether the smart lock should be opened or not is made, a pending notification is displayed on the TV device 110.

In one example, if a signal or instruction is received to view the video on the mobile device, an action is performed to stream the video and display a question on the mobile device whether the door should be unlocked or not. If a signal or instruction is received to not display the video, the notification is closed. If no response to the query of whether the video should be displayed or not, a pending notification is displayed on the mobile device. If the signal or instruction to view the video was received, it is determined whether the smart lock should be remotely unlocked or not. If a signal or instruction is received to unlock the smart lock (e.g., the front door lock), an action is performed to unlock the smart lock (e.g., for a particular time, such as 20 seconds, etc.). If a signal or instruction is received to not open the smart lock, the door remains locked. If no response to the query of whether the smart lock should be opened or not is made, a pending notification is displayed on the mobile device and the door remains locked.

Figure 8:
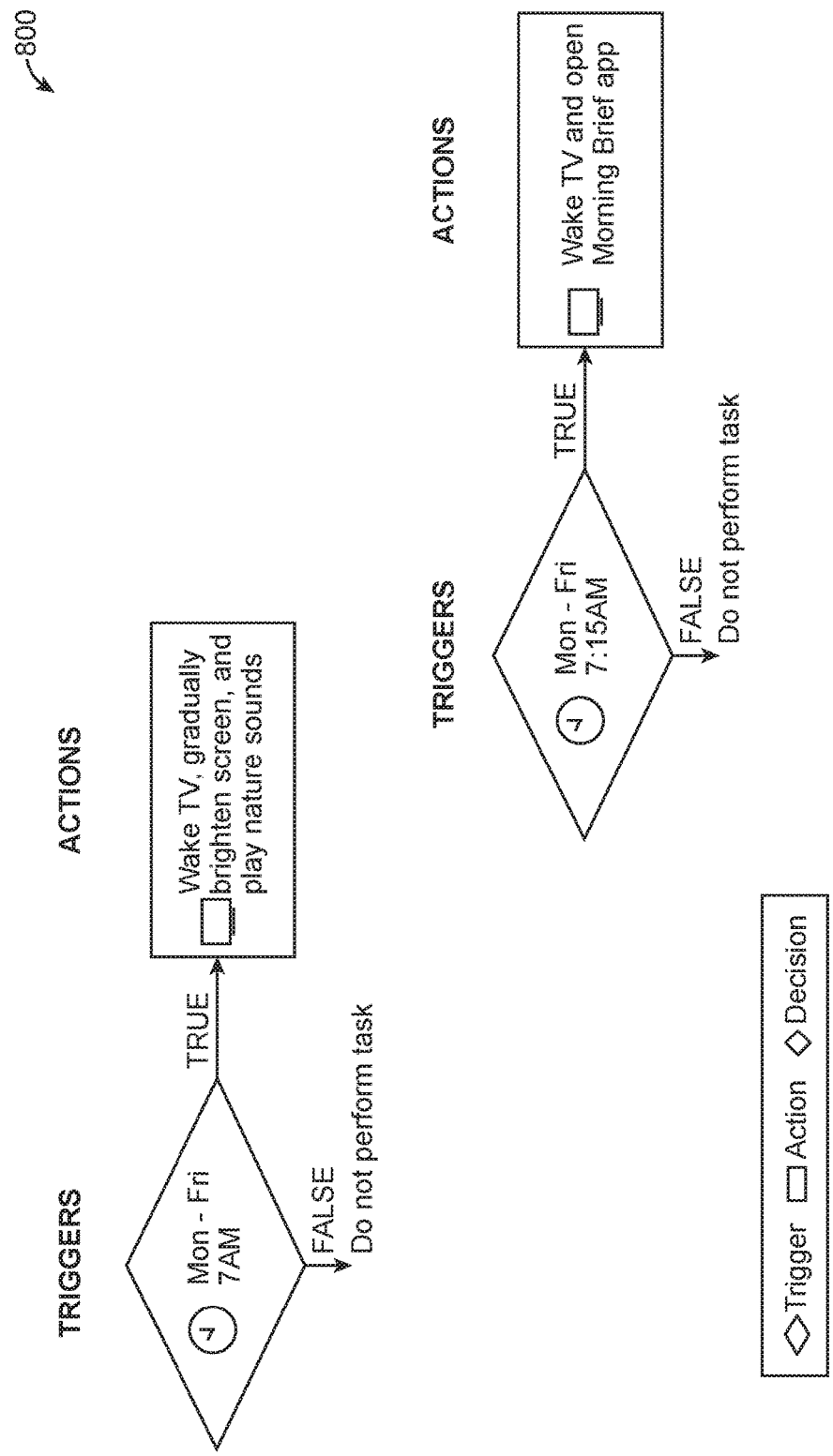
FIG. 8 shows an exemplary flow diagram for a morning routine, according to an embodiment.

FIG. 8 shows an exemplary flow diagram 800 for a morning routine, according to an embodiment. In one example, the TV device 110 (e.g., located in the bedroom) simulates the lighting of daybreak by gradually lighting the room based on a schedule while playing soothing nature sounds or being tuned to a particular channel (e.g., nature sounds source are files stored in the TV device 110.) At a particular time, the TV device 110 turns on and displays traffic, news, and weather information. In one example, the trigger for the routine may include determining a schedule (e.g., a particular time for particular day(s) of the week).

In one example, the flow diagram 800 begins by determining whether a particular time (e.g., 7 AM) for particular day(s) of the week (e.g., Monday-Friday) criterion is detected or not by the TV device 110. If the criterion is not detected, the routine loops back or waits until the criterion is detected. If the criterion is detected, then a first action is determined (e.g., using the actions table, such as actions Table 2A or 2B) and performed (e.g., the TV device 110 changes state from sleep to wake, the TV device 110 screen is gradually brightened, and nature or other sounds are played). In one example, if another trigger is selected, such as another particular time (e.g., 7:15 AM) for particular day(s) of the week (Monday-Friday) criterion, it is determined whether the second criterion is detected or not by the TV device 110. If the second criterion is not detected, the routine loops back or waits until the second criterion is detected. If the second criterion is detected, then a second action is determined and performed (e.g., the TV device 110 wakes, and a morning brief app is executed (e.g., weather, news, traffic, etc.) and displayed on the TV device 110 screen.

Figure 9:
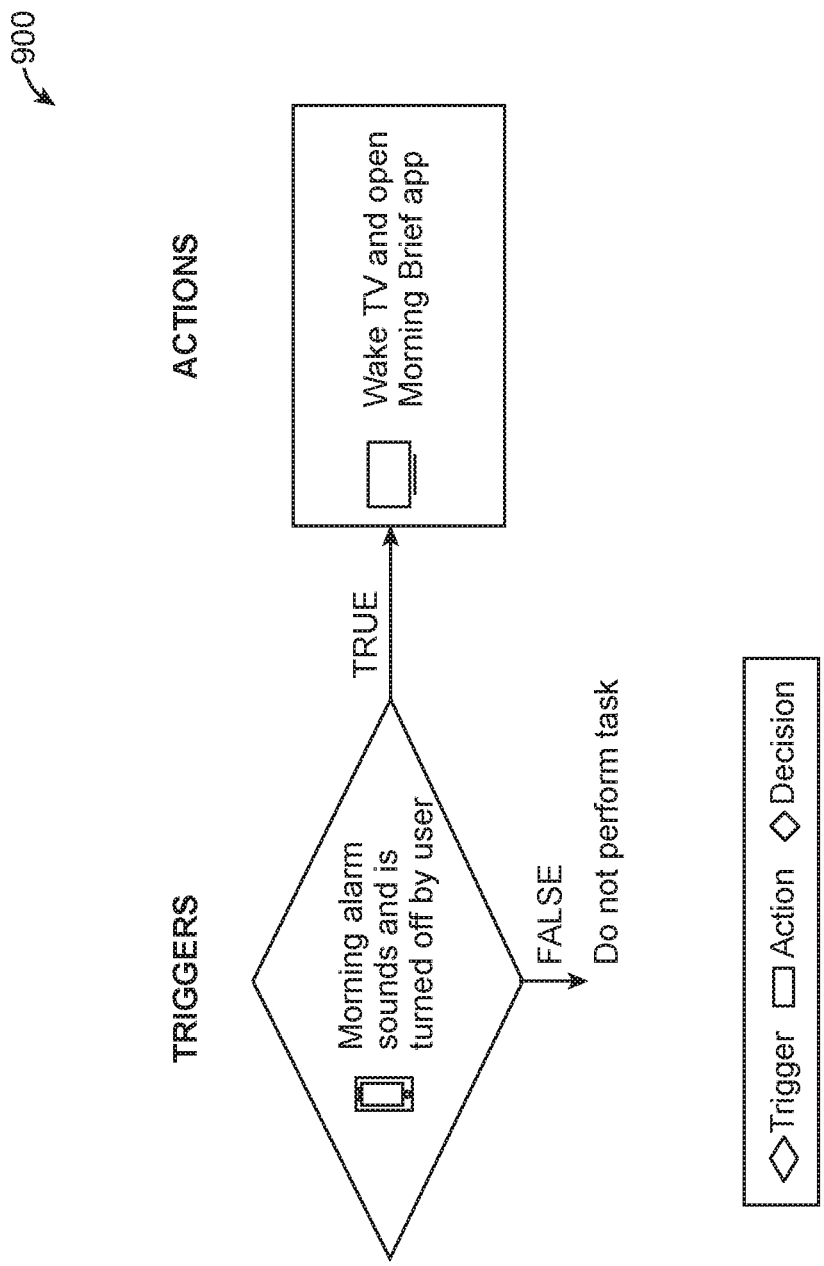
FIG. 9 shows an exemplary flow diagram for a morning routine interaction with a mobile device, according to an embodiment.

FIG. 9 shows an exemplary flow diagram 900 for a morning routine interaction with a mobile device, according to an embodiment. In one example, a good morning routine (which includes the TV device 110 switching on) is triggered by the alarm clock of the mobile device and it may respond with a snooze selection. In one example, the trigger for the routine may include criteria for detecting a morning alarm sound or signal that is turned off. In one example, if the criteria are not detected, the routine loops back or continues to wait for the criteria to occur. If the criteria are detected, an action is determined (e.g., using the actions table, such as actions Table 2) and performed (e.g., the TV device 110 wakes, and a morning brief app is executed (e.g., weather, news, traffic, etc.) and displayed on the TV device 110 screen.

Figure 10:
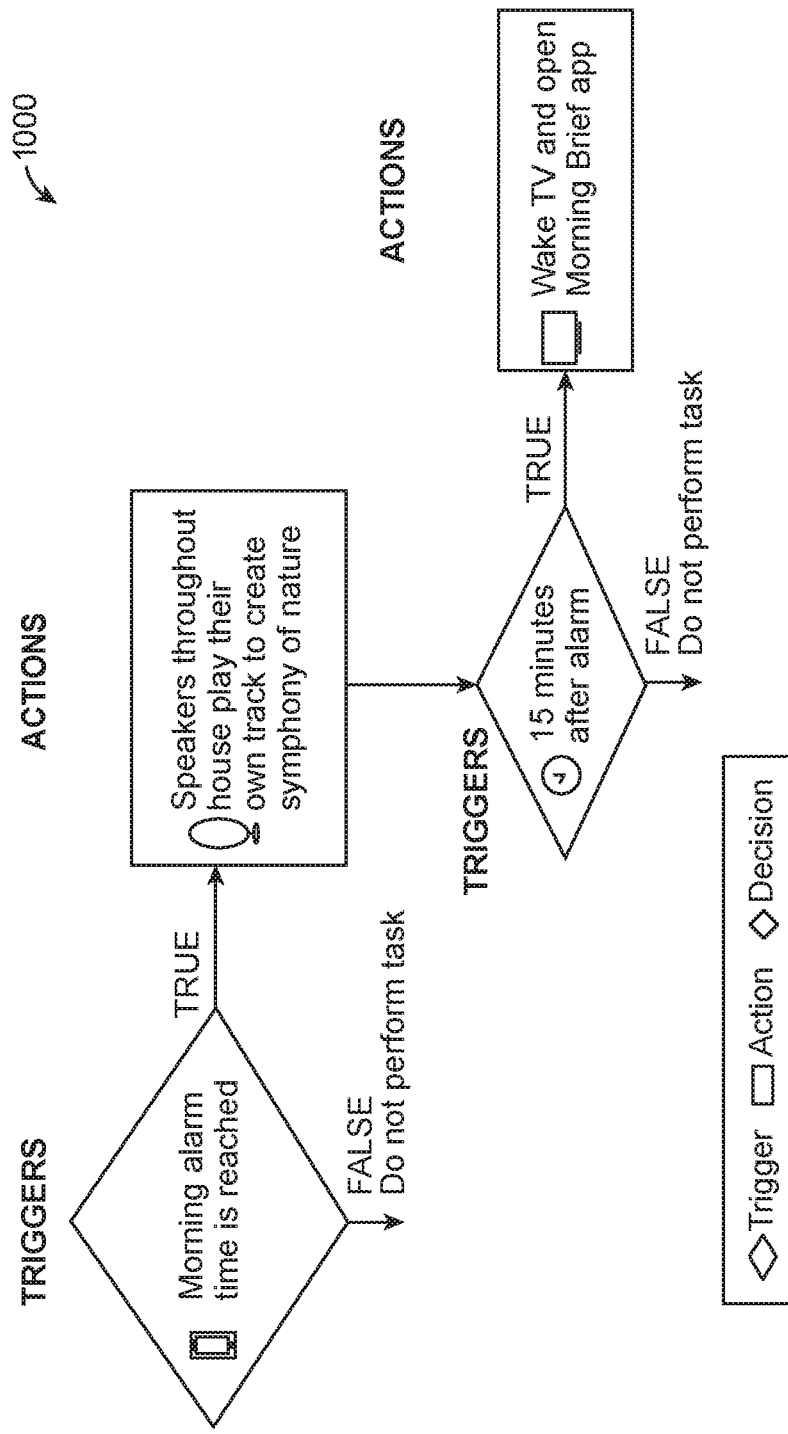
FIG. 10 shows an exemplary flow diagram for a morning routine interaction with a mobile device and speaker, according to an embodiment.

FIG. 10 shows an exemplary flow diagram 1000 for a morning routine interaction with the TV device 110, a mobile device and speaker device, according to an embodiment. In one example, the relaxing wake-up music plays over all speaker devices in the house. Each speaker device is playing one audio track to create a symphony of nature.

In one example, a trigger for the routine may include a first criterion for determining if a particular time for a morning alarm of a mobile device is reached and a second trigger may include a second criterion for determining another particular time (after the alarm sounds). In one example, if the first criterion is not detected, the routine loops back or continues to wait for the first criterion to occur. If the first criterion is detected, an action is determined (e.g., using the actions table, such as actions Table 2A or 2B) and performed (e.g., speaker devices throughout the home or other location each play a separate track to create a symphony of sounds, such as nature. It is then determined whether the second criterion is met or not. If the second criterion is not met, the routine loops back or waits for detection of the second criterion. If the second criterion has been met (e.g., it is 7:15 AM), another action is determined and performed (e.g., the TV device 110 wakes, and a morning brief app is executed (e.g., weather, news, traffic, etc.) and displayed on the TV device 110 screen).

Figure 11:
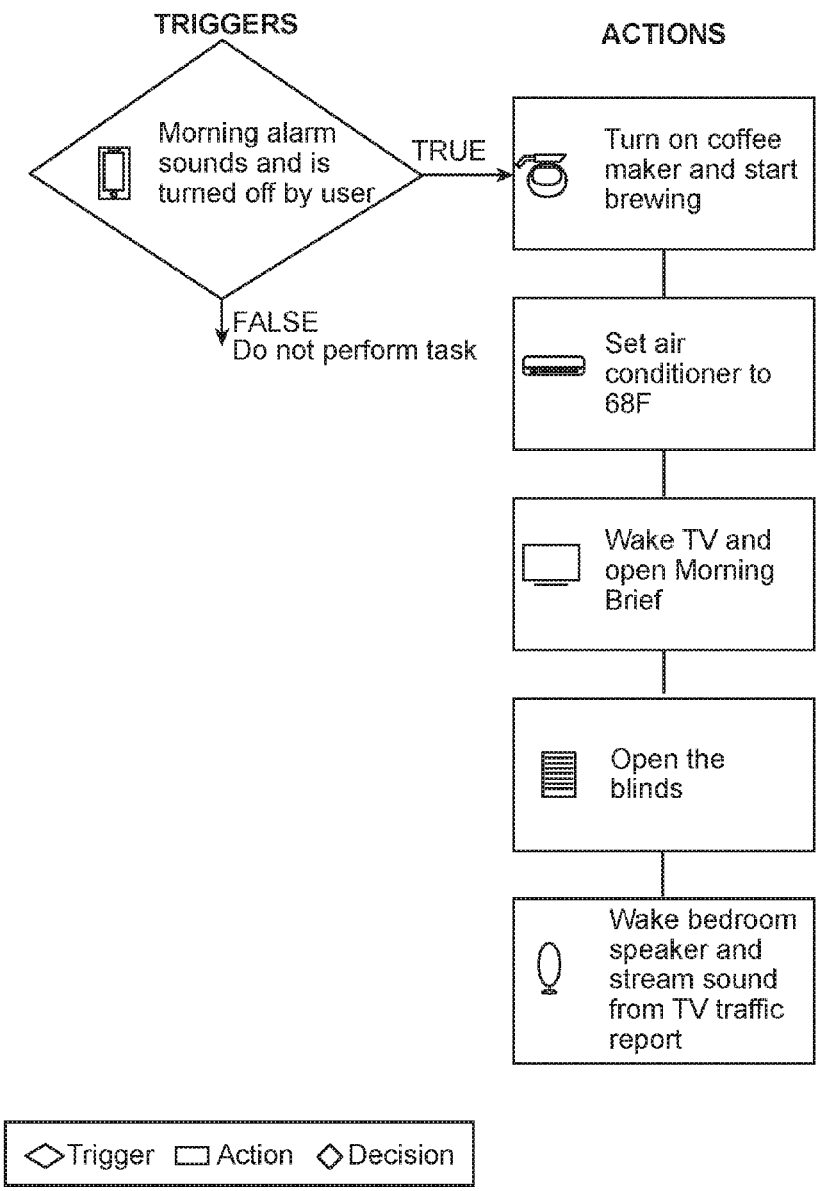
FIG. 11 shows an exemplary flow diagram for a connected home morning routine, according to an embodiment.

FIG. 11 shows an exemplary flow diagram 1100 for a connected home morning routine, according to an embodiment. In one example, the routine may include a trigger including criteria for determining that a mobile device alarm has sounded. Blinds open up, the coffee machine or water heater turns on and prepares for use while the air conditioner (AC)/heater is set to the preferred temperature. In one example, if the criterion is not detected, the routine loops back or continues to wait for the criterion to occur. If the criterion is detected, actions are determined (e.g., using the actions table, such as actions Table 2A or 2B) and performed (e.g., a coffee maker is turned on and starts brewing, the AC is set to a particular temperature (e.g., 68 degrees), the TV device 110 changes to a wake state and the morning brief app is executed (e.g., weather, news, traffic, etc.), motorized blinds are opened, and a speaker device in the bedroom is changed to a wake state and sound is streamed from a TV device 110 traffic report).

Figure 12:
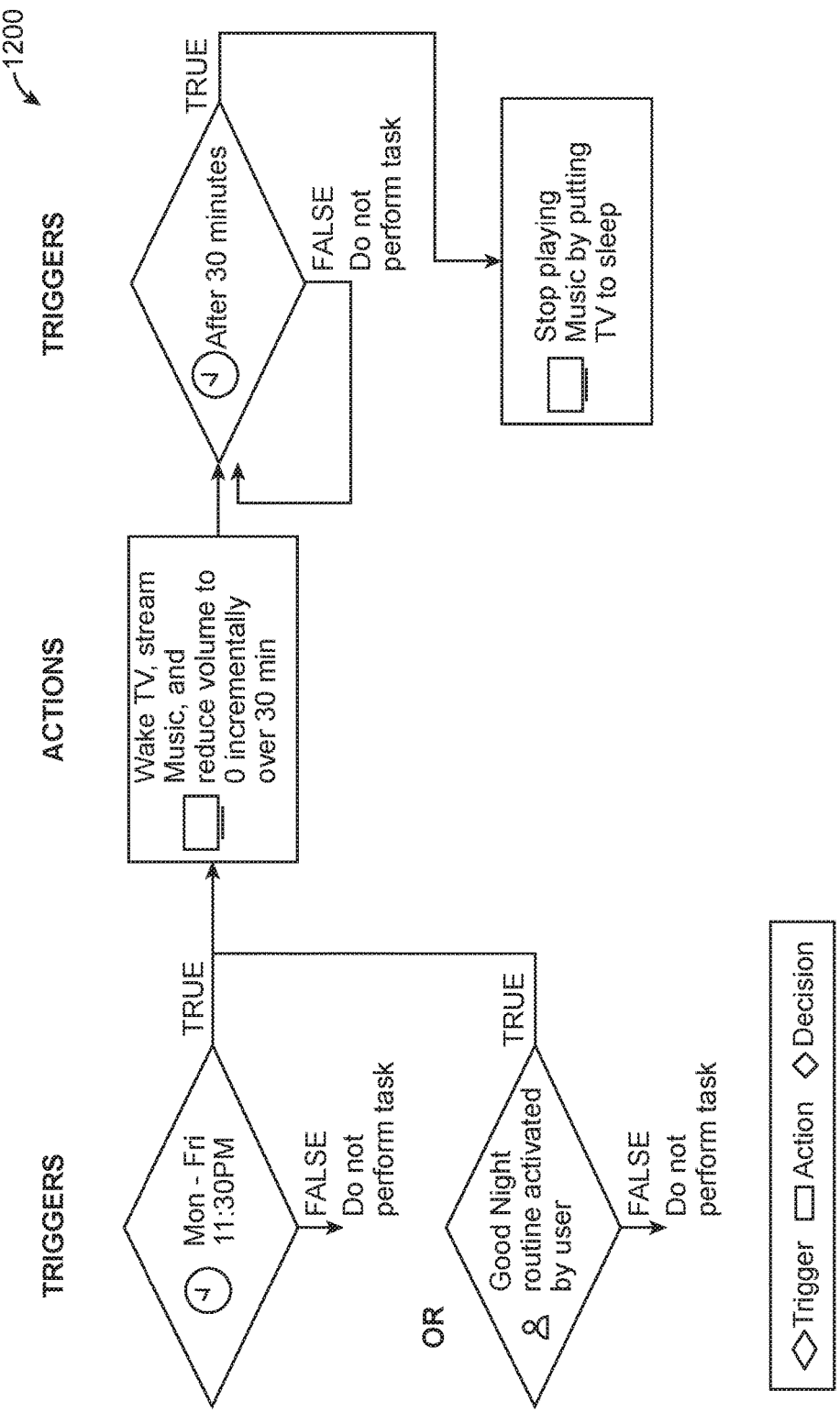
FIG. 12 shows an exemplary flow diagram for a nighttime routine with a TV device only, according to an embodiment.

FIG. 12 shows an exemplary flow diagram 1200 for a night-time routine with a TV device 110 only, according to an embodiment. The bedroom TV device 110 speaker plays soothing music, which will fade to silence over a predetermined time. This creates a relaxing environment while people are getting ready to go to sleep. The triggers for the routine may include determination of certain time and day(s) of the week criteria, and whether a good night routine is activated.

In one example, the routine determines whether a particular day(s) of the week (e.g., Monday-Friday) and particular time (e.g., 11:30 PM) criteria have both been met or not. If both criteria are not met, the routine is not performed. If both criteria are met, an action is determined (e.g., using an action table, such as Table 2A or 2B) and is performed (e.g., change TV device 110 power from sleep to wake, turn on music from the TV device 110 speaker with volume that is reduced incrementally over time (e.g., every 30 minutes). It is determined if a particular time criterion has elapsed (e.g., after 30 minutes). If the particular time criterion has not elapsed, the routine loops back or waits until the criterion is met to proceed. Once the criterion has been met, another action is determined and performed (e.g., stop playing the music by changing the TV device 110 power from wake to sleep).

Figure 13:
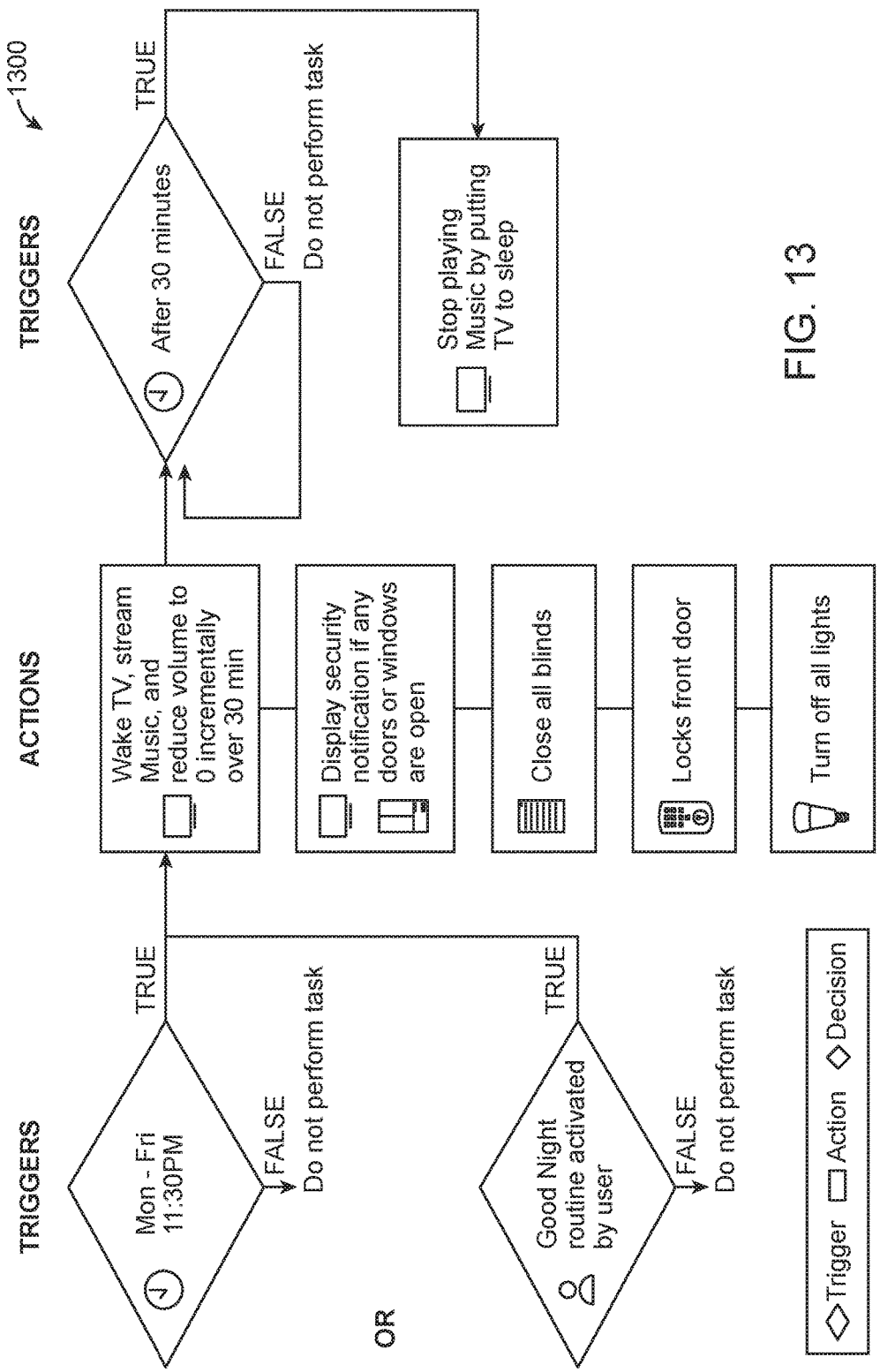
FIG. 13 shows an exemplary flow diagram for a nighttime routine with a TV device and connected device, according to an embodiment.

FIG. 13 shows an exemplary flow diagram 1300 for a night-time routine with a TV device 110 and connected device, according to an embodiment. In one example, the bedroom TV device 110 speaker plays soothing music, which fades to silence over a predetermined time. This creates a relaxing environment while people are getting ready to go to sleep. The house closes all motorized blinds that have not already been closed, turns off the lights, locks smart locks (e.g., on the front door), and reports on the TV device or others if any doors or windows are open that should not be (e.g., using window/door sensors, such as magnetic alarm type sensors). If the user has a security alarm system, the alarm is set to "stay" mode (e.g., perimeter sensors are activated, motion sensors are de-activated). The triggers for the routine may include determination of certain time and day(s) of the week criteria, and whether a good night routine is activated.

In one example, the routine determines whether a particular day(s) of the week (e.g., Monday-Friday) and particular time (e.g., 11:30 PM) criteria have both been met or not. If both criteria are not met, the routine is not performed. If both criteria are met, actions are determined (e.g., using an action table, such as Table 2A or 2B) and are performed (e.g., change TV device 110 power from sleep to wake, turn on music from the TV device 110 speaker with volume that is reduced incrementally over time (e.g., every 30 minutes), display notification on the TV device 110 regarding any open doors and windows, close all motorized blinds, lock the front door smart lock and turn off all selected lights). It is determined if a particular time criterion has elapsed (e.g., after 30 minutes). If the particular time criterion has not elapsed, the routine loops back or waits until the criterion is met to proceed. Once the criterion has been met, another action is determined and performed (e.g., stop playing the music by changing the TV device 110 power from wake to sleep).

Figure 14:
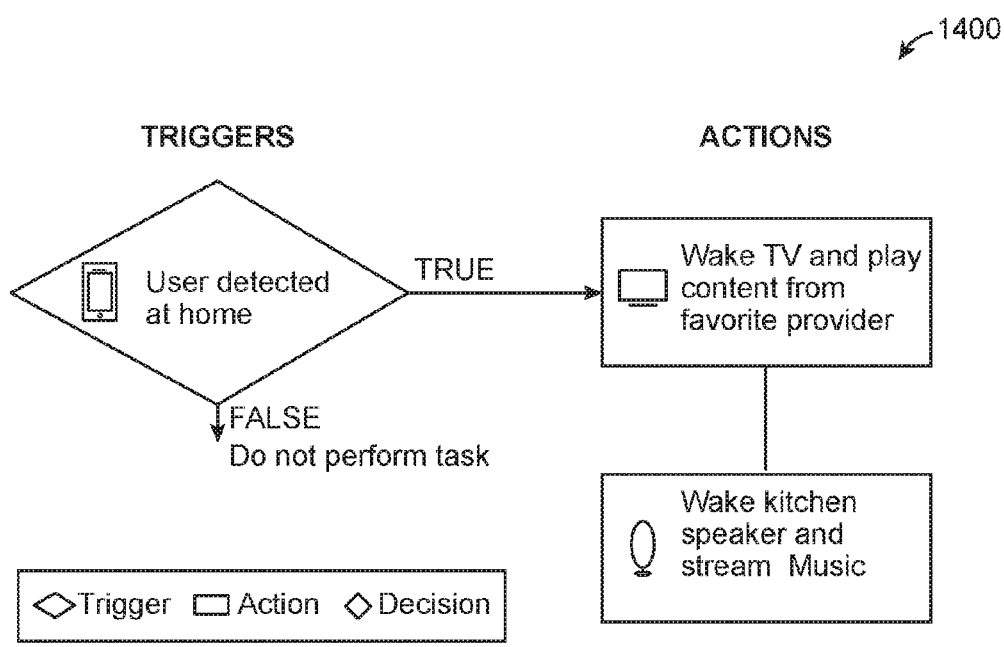
FIG. 14 shows an exemplary flow diagram for a welcome home routine with a TV device, a mobile device and a speaker device, according to an embodiment.

FIG. 14 shows an exemplary flow diagram 1400 for a welcome home routine with a TV device 110, a mobile device and a speaker device, according to an embodiment. In one example, when a user is coming home, which is detected through the global positioning system (GPS) device of the mobile device, the TV device 110 turns on the favorite channel or content provider. With a speaker device, when a user returns home the speaker device may play a user's favorite station, music service, playlist, album or track. The trigger for the routine may include criteria for a determination that a user is detected at home (or any other place or location). In one example, the routine determines whether the criteria have been met or not. If the criteria are not met, the routine is not performed. If the criteria are met, actions are determined (e.g., using an action table, such as Table 2A or 2B) and are performed (e.g., change TV device 110 power from sleep to wake and play content from a favorite provider or a particular recorded content, wake a kitchen speaker and stream music).

Figure 15:
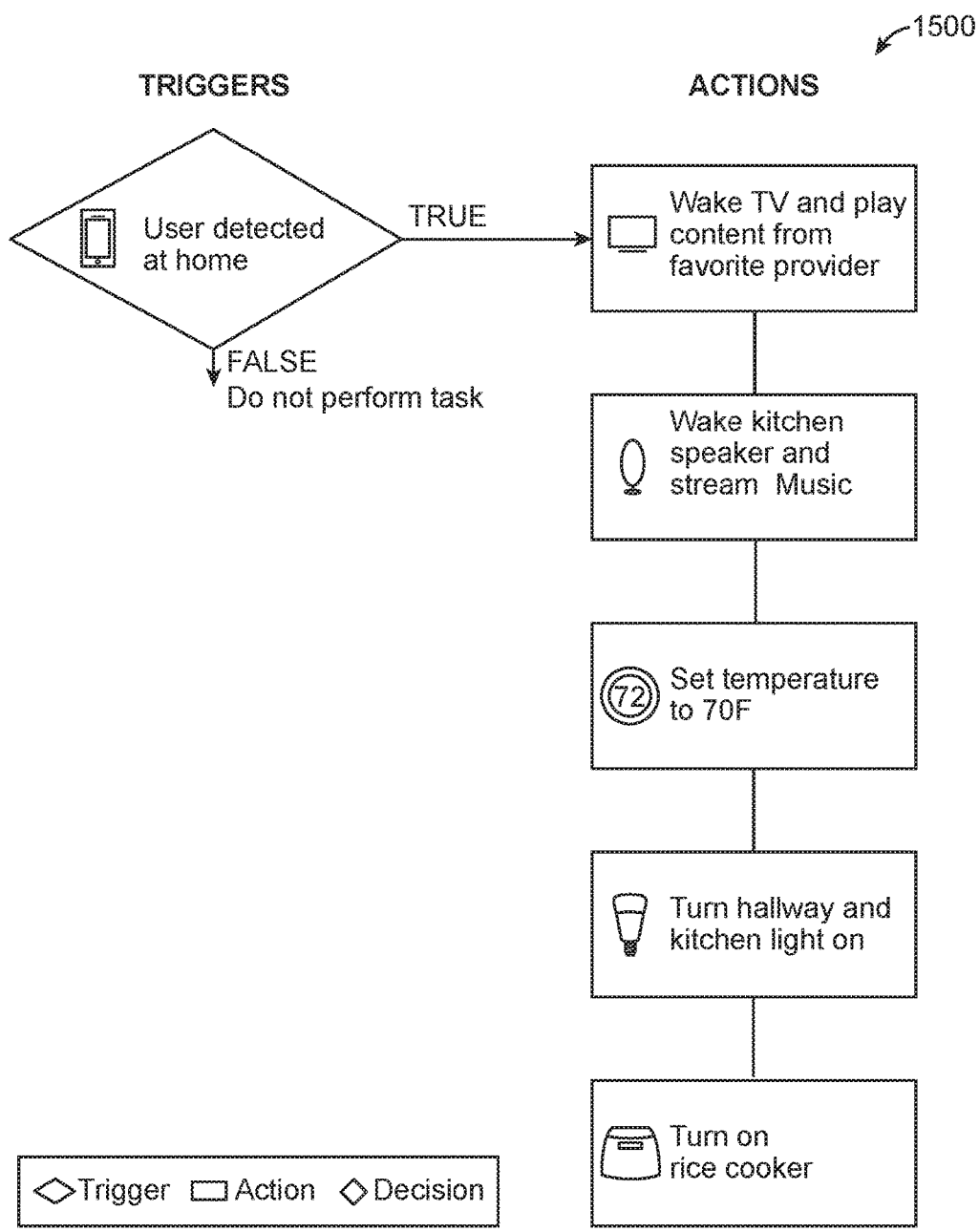
FIG. 15 shows an exemplary flow diagram for a welcome home routine with a TV and connected devices, according to an embodiment.

FIG. 15 shows an exemplary flow diagram 1500 for a welcome home routine with a TV device 110 and connected devices, according to an embodiment. In one example, when a user is coming home, which is detected through the GPS of a mobile device, the TV device 110 turns on the favorite channel or content provider. With added IoT devices, an elaborate welcome home automation may be organized, involving many other devices, such as cookers, thermostats, lights, automated fire places, etc. The trigger for the routine may include criteria for a determination that a user is detected at home (or any other place or location). In one example, the routine determines whether the criteria have been met or not. If the criteria are not met, the routine is not performed. If the criteria are met, actions are determined (e.g., using an action table, such as Table 2A or 2B) and are performed (e.g., change TV device 110 power from sleep to wake and play content from a favorite provider or a particular recorded content, wake a kitchen speaker and stream music, set a thermostat to a particular temperature (e.g., 70 degrees), turn on hallway and kitchen lights, and turn on rice cooker).

Figure 16A:
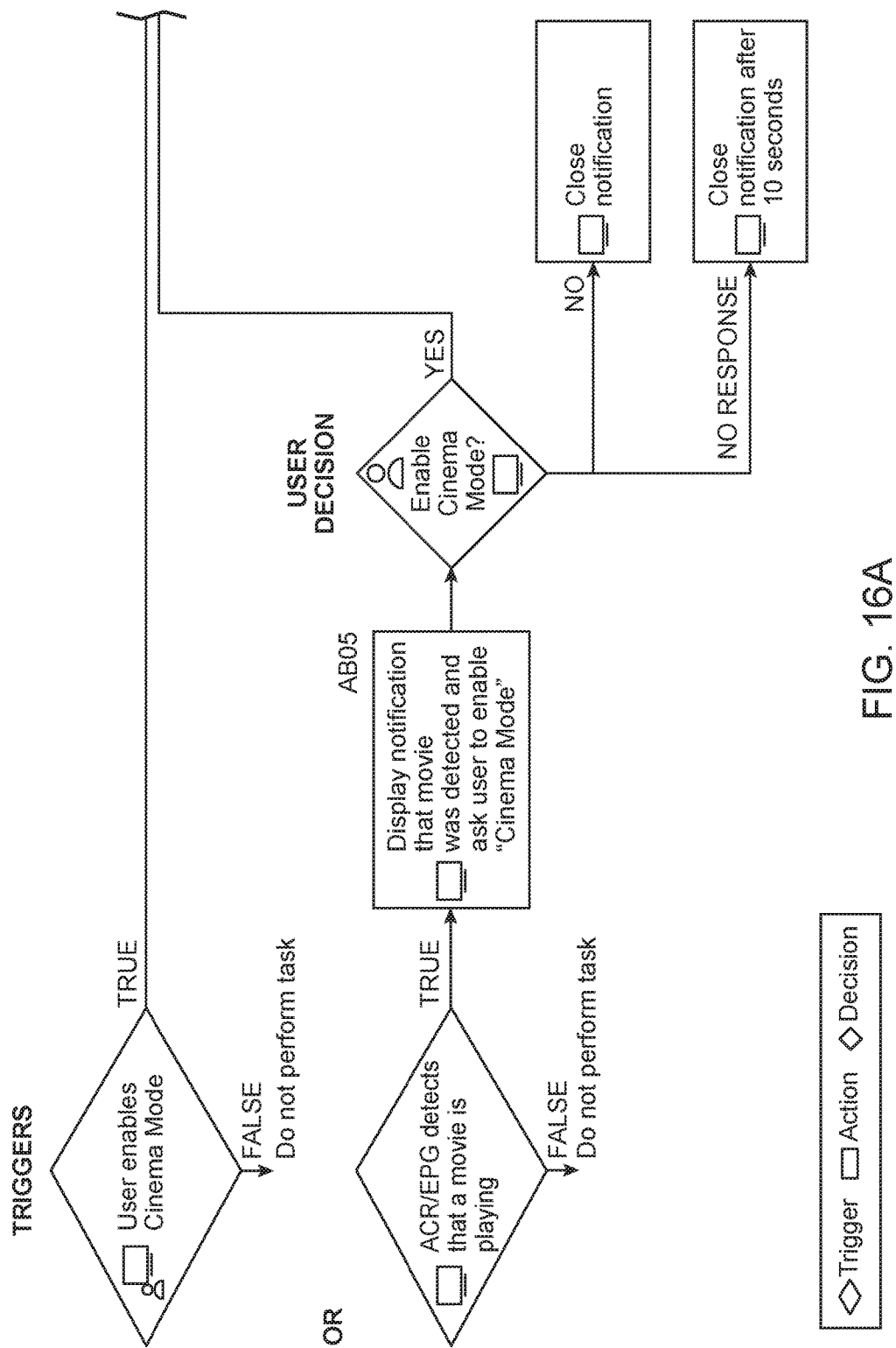
FIGS. 16A-B show an exemplary flow diagram for a cinema mode routine with a TV device and a mobile device, according to an embodiment.
Figure 16B:
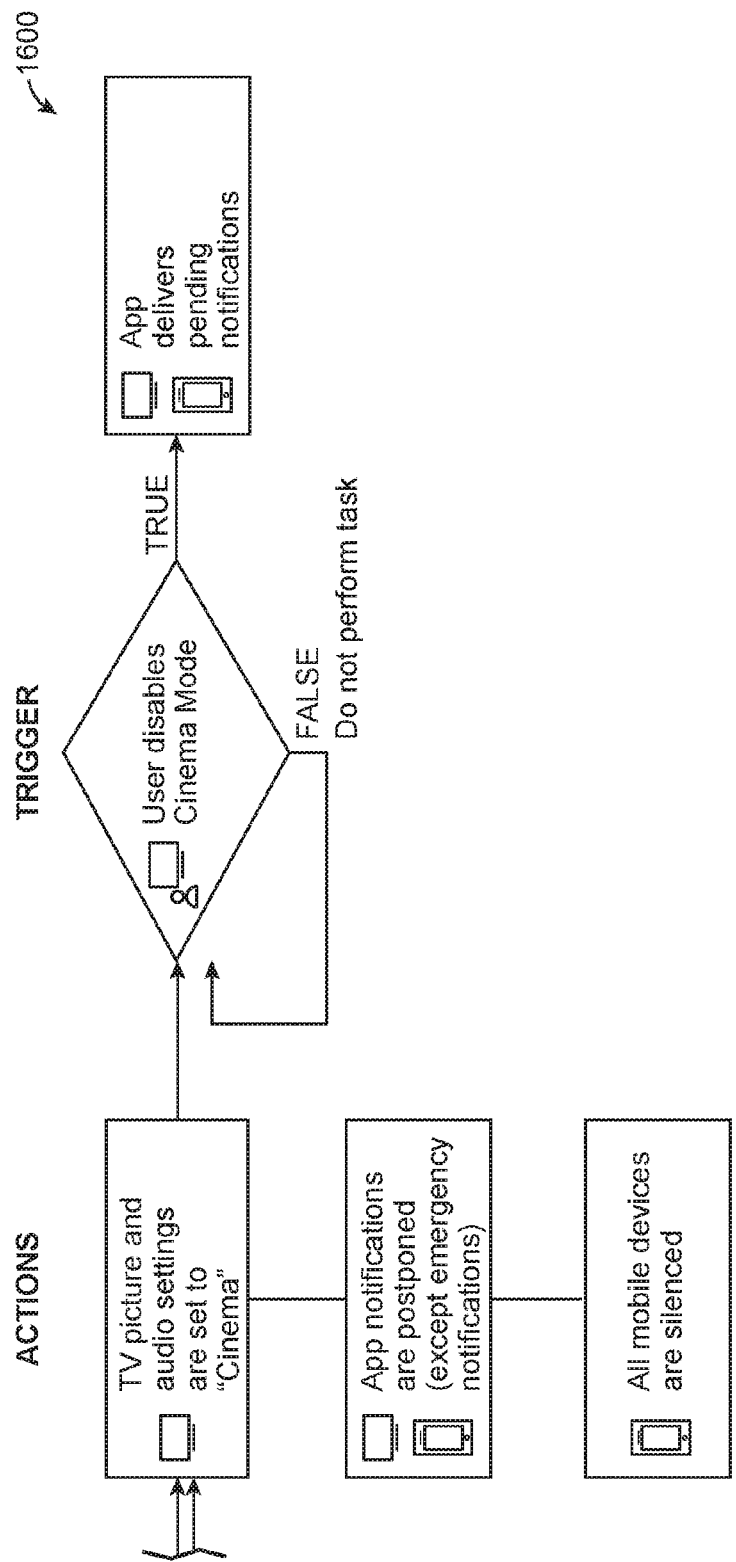

FIGS. 16A-B show an exemplary flow diagram 1600 for a cinema mode routine with a TV device 110 and a mobile device, according to an embodiment. In one example, when the movie mode is enabled, the TV device 110 picture and audio settings are set to "cinema." Mobile devices will be set to silent, notifications are postponed; only emergency level notifications are delivered. The triggers for the routine may include a first criterion for enabling cinema mode and a second criterion for automatic content recognition (ACR)/electronic programming guide (EPG) detecting that a movie is playing on the TV device 110.

In one example, the routine determines whether the first criterion or the second criterion have been met or not. If the first criterion is met, the routine actions are determined (e.g., using an action table, such as Table 2A or 2B) and are performed (e.g., TV device 110 picture and audio settings are set to "cinema" mode, notifications (e.g., TV, TV App notifications, etc.) are postponed except for emergency notifications, all mobile devices are silenced). If cinema mode is disabled, the notifications that were postponed are delivered. Otherwise, the routine loops back or waits for cinema mode to be disabled. If the first criterion is not met, the routine waits for the first criterion or for the second criterion to be met. If the second criterion is not met, the routine loops back or waits for the second criterion to be met. If the second criterion is met, an action is determined and performed (e.g., display notification that a movie was detected and requesting cinema mode to be enabled). The routine then checks whether cinema mode has been enabled by the user or not. If cinema mode has been declined to be enabled, an action is determined and performed (e.g., the notification is closed). If no response has been received, the notification is closed after a time period (e.g., 10 seconds). If cinema has been selected to be enabled, the routine proceeds to the actions as described above regarding the situation where the trigger of cinema mode being enabled is detected.

Figure 17A:
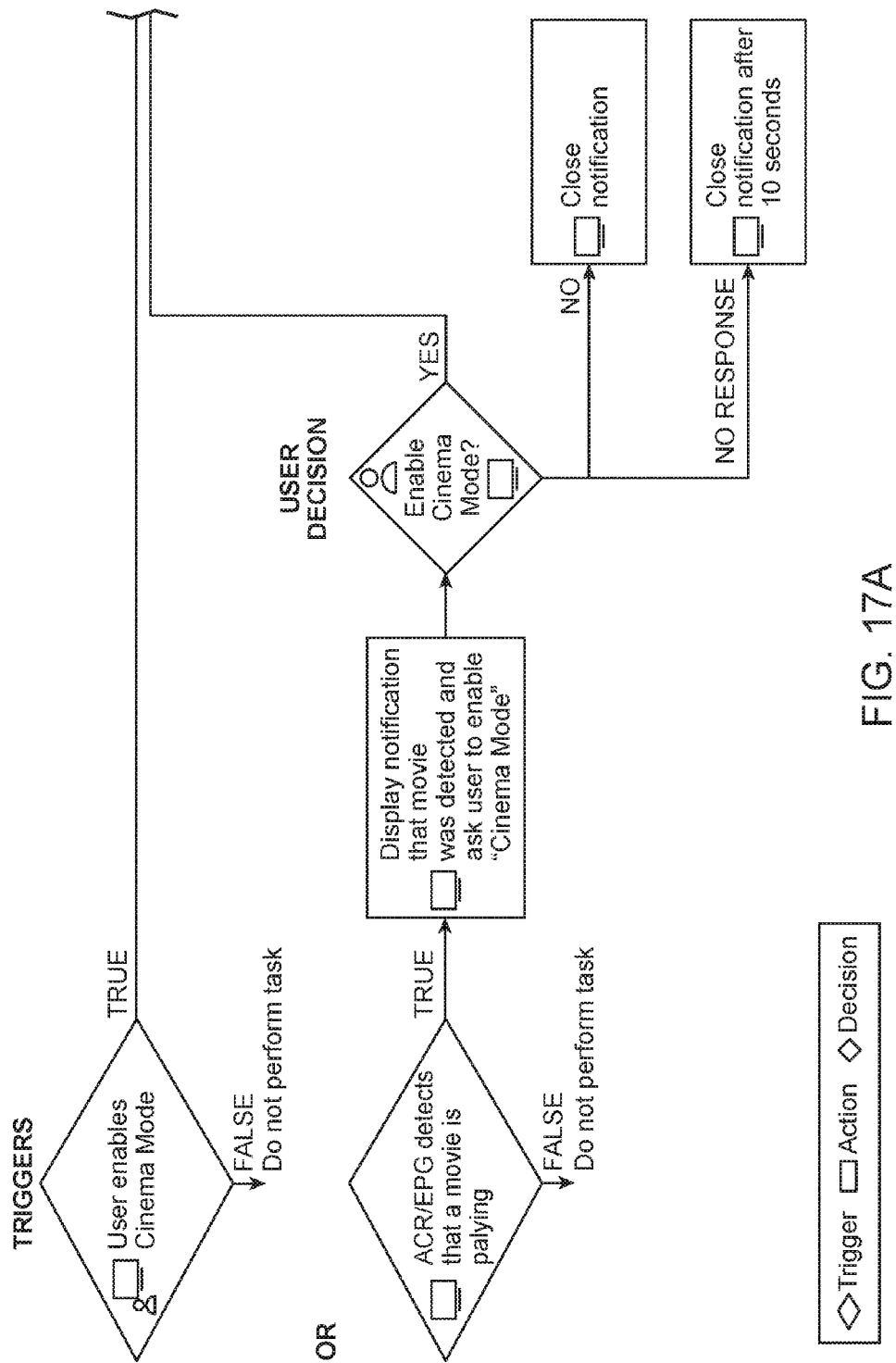
FIGS. 17A-B show an exemplary flow diagram for a cinema mode routine with a TV device and connected devices, according to an embodiment.
Figure 17B:
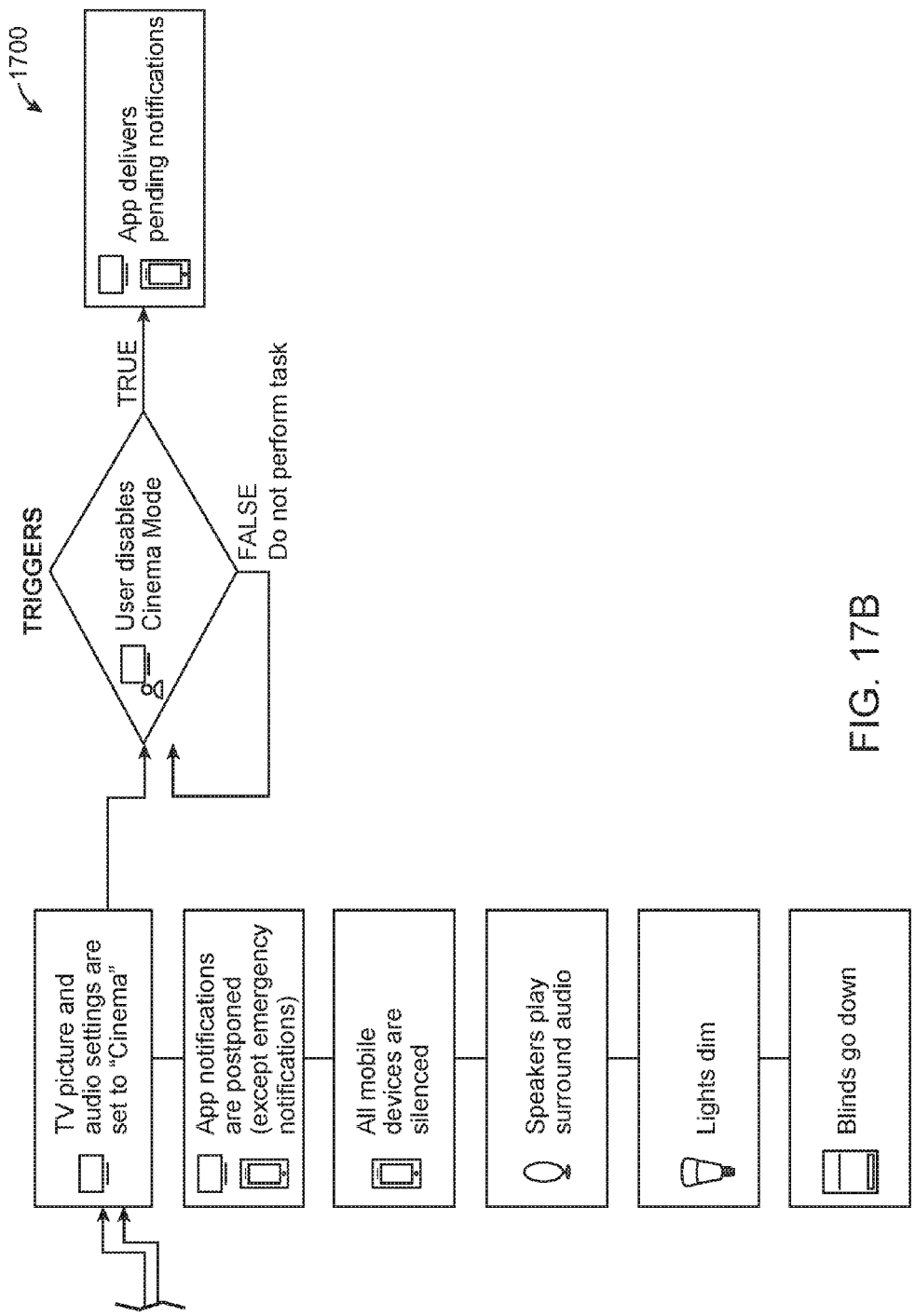

FIGS. 17A-B show an exemplary flow diagram 1700 for a cinema mode routine with a TV device 110 and connected devices, according to an embodiment. In one example, when the cinema mode is enabled, the TV device 110 picture and audio settings are set to "cinema." Mobile devices are set to silent, notifications are postponed, and only emergency level notifications are delivered. The speakers in the room are used to enhance the movie experience by playing surround audio. Lights will dim and motorized blinds are closed when cinema mode starts. The triggers for the routine may include a first criterion for enabling cinema mode and a second criterion for ACR/EPG detecting that a movie is playing on the TV device 110.

In one example, the routine determines whether the first criterion or the second criterion have been met or not. If the first criterion is met, actions are determined (e.g., using an action table, such as Table 2A or 2B) and are performed (e.g., TV device 110 picture and audio settings are set to "cinema" mode, notifications (e.g., TV. TV App notifications, etc.) are postponed except for emergency notifications, all mobile devices are silenced, speakers are set to play surround audio, lights in the room are dimmed and motorized blinds are closed). If cinema mode is disabled, the notifications that were postponed are delivered. Otherwise, the routine loops back or waits for cinema mode to be disabled. If the first criterion is not met, the routine loops back or waits for the first criterion or for the second criterion to be met. If the second criterion is not met, the routine loops back or waits for the second criterion to be met. If the second criterion is met, an action is determined and performed (e.g., display notification that a movie was detected and requesting cinema mode to be enabled). The routine then checks whether cinema mode has been enabled or not. If cinema mode has been declined to be enabled, an action is determined and performed (e.g., the notification is closed). If no response has been received, the notification is closed after a time period (e.g., 10 seconds). If cinema has been selected to be enabled, the routine proceeds to the actions as described above regarding the situation where the trigger of cinema mode being enabled is detected.

Figure 18A:
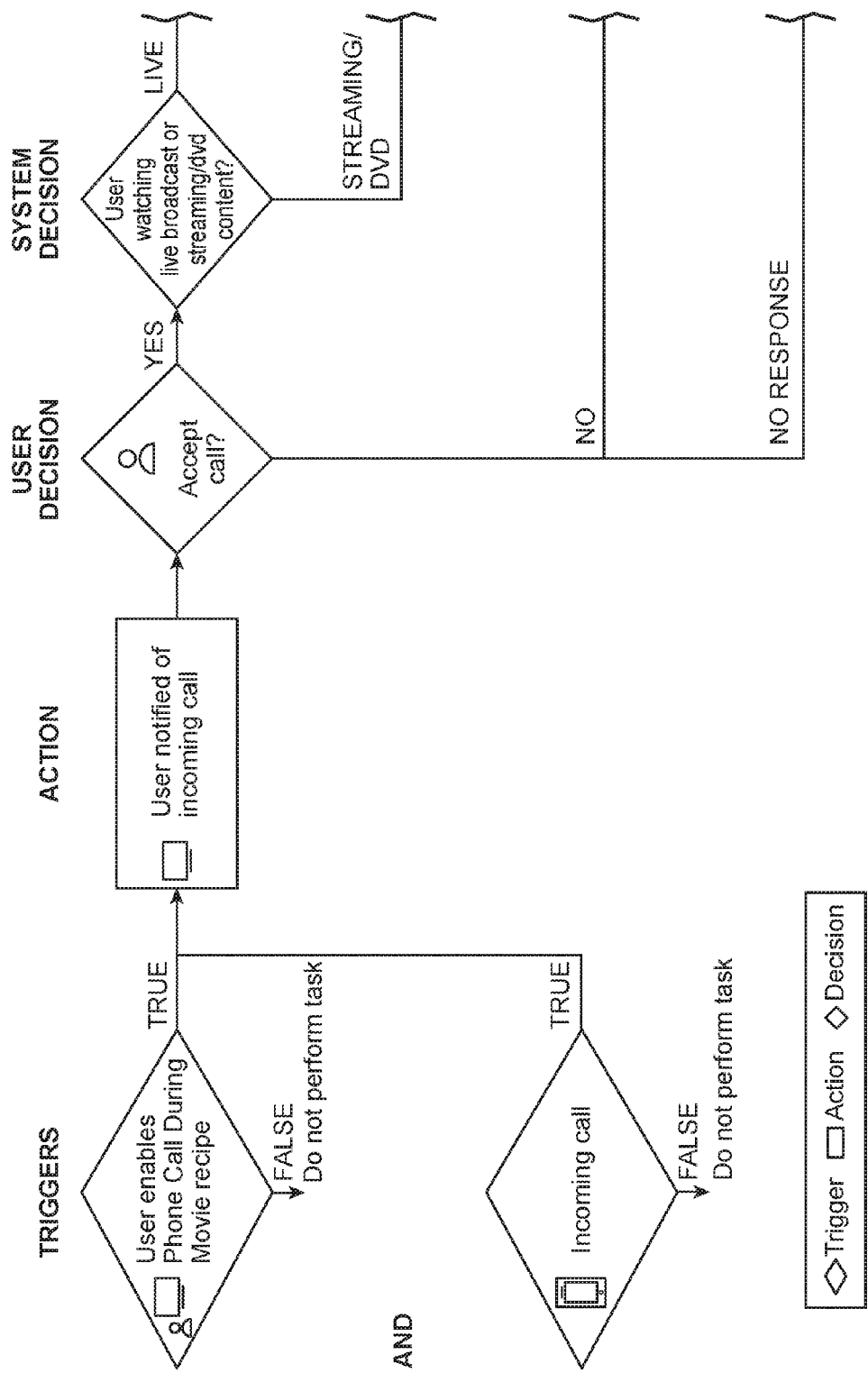
FIGS. 18A-B show an exemplary flow diagram for a phone call with a mobile device during a movie shown on the TV, according to an embodiment.
Figure 18B:
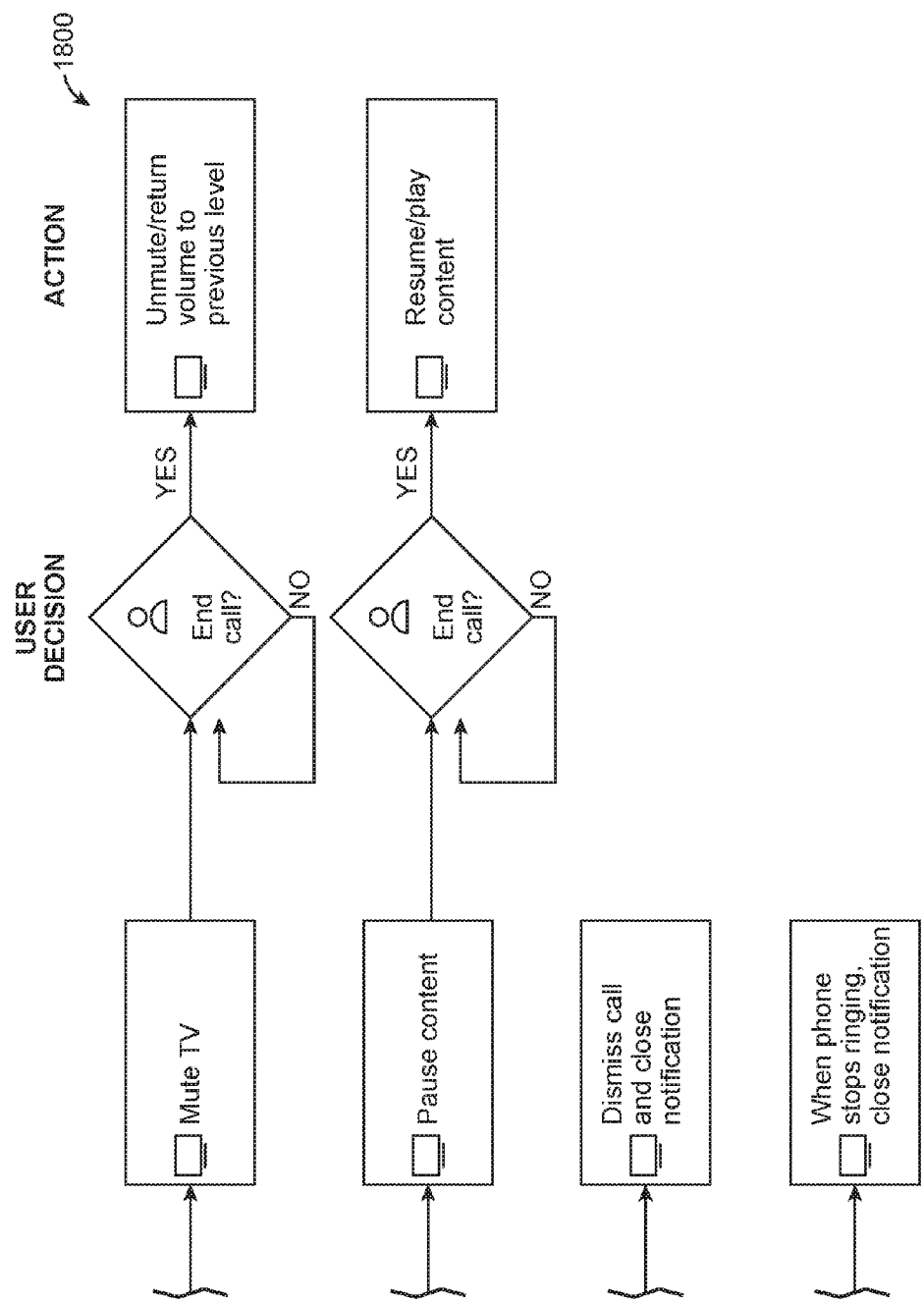

FIGS. 18A-B show an exemplary flow diagram 1800 for a phone call with a mobile device during a movie shown on the TV device 110, according to an embodiment. In one example, a user is notified on the TV device 110 of incoming phone calls. If a call is answered, the movie content is paused/live broadcast muted. When the call is finished, the movie resumes/live broadcast returns to previous volume level. The triggers for the routine may include a first criterion for a user to enable the phone calls during a movie routine and a second criterion for detecting an incoming phone call on a mobile device.

In one example, the routine determines whether the first criterion and the second criterion have been met or not. If only either the first criterion or the second criterion is met, the routine loops back or waits for both the first and second criteria to be met. If the first criterion and the second is met, an action is looked up (e.g., using an action table, such as Table 2A or 2B) and is performed (e.g., a notification of an incoming call is displayed on the TV device 110). The routine proceeds to determine whether the incoming call is accepted or not. If the incoming call is not accepted, the call is dismissed and the notification is closed. If no response is received, when the mobile device stops ringing, the notification is closed. If the call is accepted, it is determined whether the TV device 110 is playing a broadcast, streaming video, playing recorded content, playing a DVD, etc. If it is determined that the TV device 110 is playing live content, the TV device 110 is muted until it is determined that the call has ended. If the call ends, then the TV device 110 is un-muted and the volume is returned to the previous setting. If it is determined that the TV device 110 is streaming video or playing a DVD, the content is paused until the call ends, then the playing of content is resumed.

Figure 19:
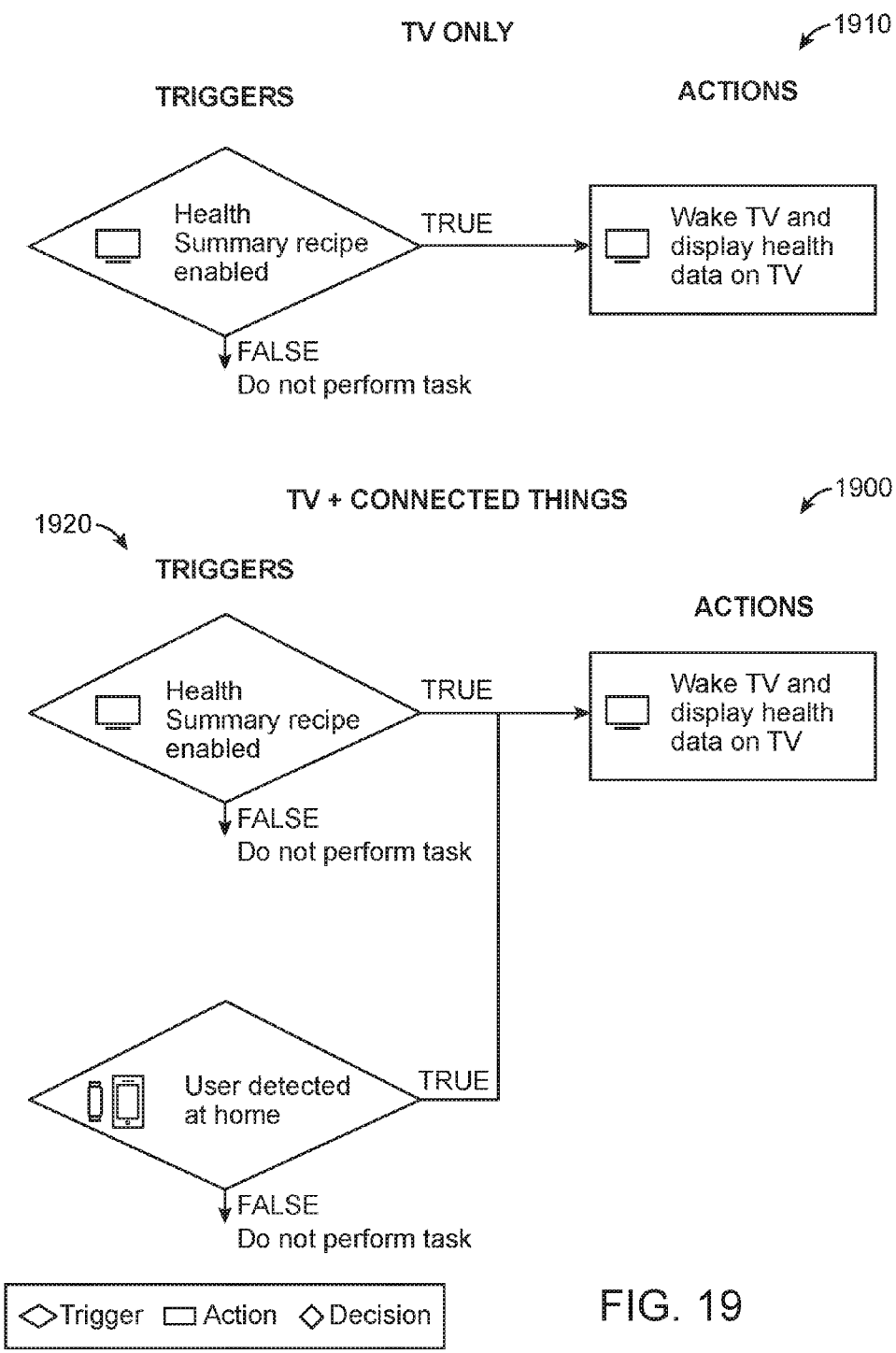
FIG. 19 shows an exemplary flow diagram for a health summary routine with a TV only and TV with connected devices, according to an embodiment.

FIG. 19 shows an exemplary routine flow 1900 including a flow diagram 1910 for a health summary routine with a TV device 110 only and a flow diagram 1920 for the TV device 110 with connected devices, according to an embodiment. In one example, a smart app that is focused on elevating a fitness wearable device and the user data that can be used to trigger actions. The flow diagram 1910 only uses the TV device 110 to display health data on and is triggered by enabling a health summary app or routine. The flow diagram 1920 uses the TV device 110 and a mobile/wearable device and triggers the TV device 110 upon arrival at a location (e.g., home) to show health data on the TV device 110.

In one example, for the flow diagram 1910, the routine determines whether the health summary app is enabled or not. If the health summary app is not enabled, the routine loops back or waits for the health summary app to be enabled. If the health summary app is enabled, an action is determined (e.g., using an action table, such as Table 2A or 2B) and performed (e.g., change the TV device 110 state to wake and display health data on the TV device 110).

In one example, for the flow diagram 1920, the routine determines whether the health summary app is enabled or not, and whether the user is detected in the home (or any other place or location where the TV device 110 is located). If the health summary app is not enabled or the user is not detected in the home, the routine loops back or waits for the health summary app to be enabled and the user to be detected. If the health summary app is enabled and the user is detected to be home, an action is determined and performed (e.g., change the TV device 110 state to wake and display health data on the TV device 110).

Figure 20:
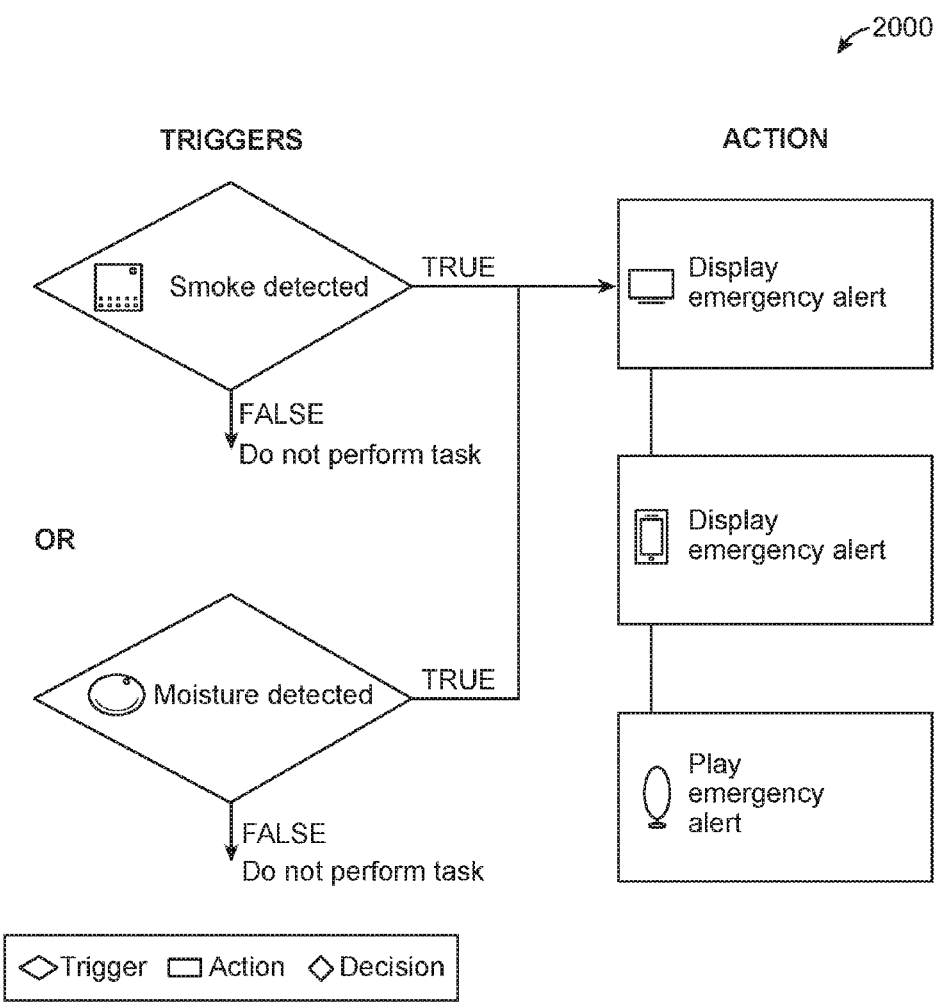
FIG. 20 shows an exemplary flow diagram for an emergency alert with a TV and connected devices, according to an embodiment.

FIG. 20 shows an exemplary flow diagram 2000 for an emergency alert with a TV device 110 and connected devices, according to an embodiment. In one example, a smoke sensor, $CO_2$ sensor, a flood sensor, glass break detection, etc. alert people in the house if there is an incident, such as a fire, $CO_2$ detection, a flood, glass breaking, etc. Mobile and speaker can be used as additional notification output. In one example, the triggers may be criteria of smoke detection or moisture detection (e.g., from a flood sensor). In one example, the routine determines whether the criteria are met for whether smoke is detected or moisture is detected (or any other sensors that may have been deployed). If no criteria have been met, the routine continues to loops back or wait for the criteria to be met. If the criteria are met, actions are determined (e.g., using an action table, such as Table 2A or 2B) and performed (e.g., change the TV device state to wake (if not already in the awake state) and display an emergency alert on the TV device 110, display an emergency alert on a mobile device, and change state of a speaker device (or all speaker devices) and play an alert sound or message).

Figure 21:
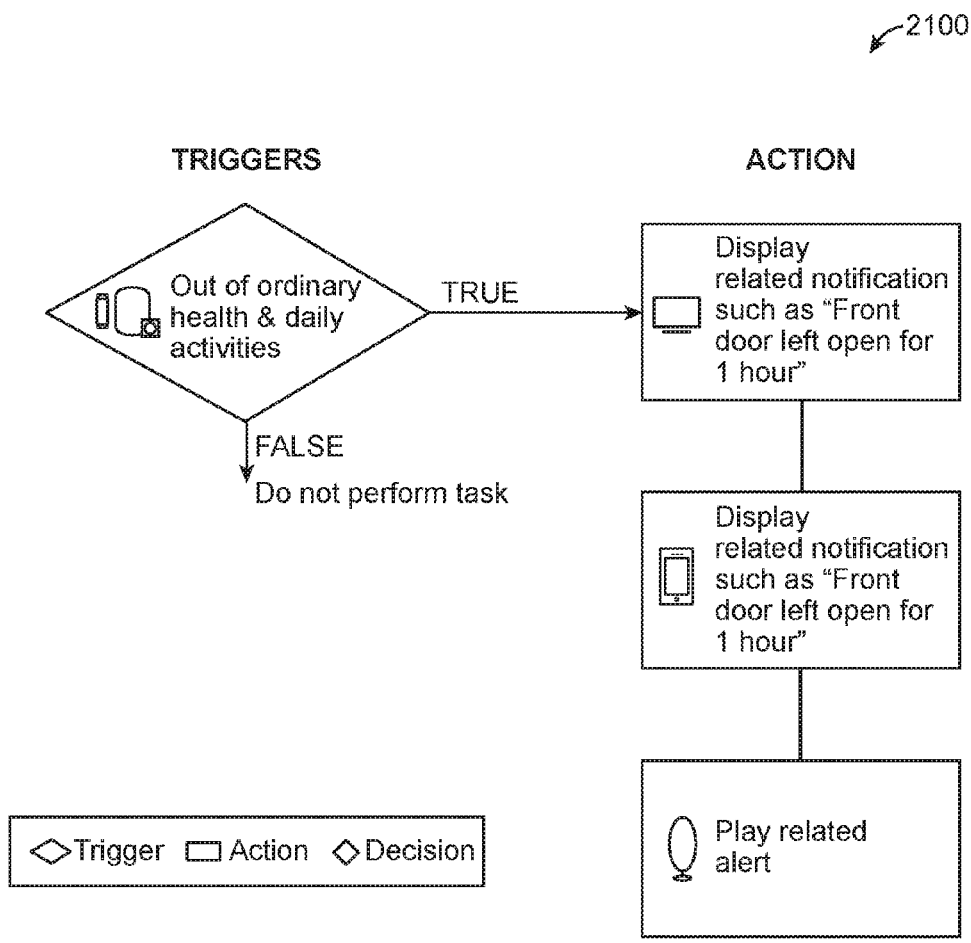
FIG. 21 shows an exemplary flow diagram for a health alert routine with a TV and connected devices, according to an embodiment.

FIG. 21 shows an exemplary flow diagram 2100 for a health alert routine with a TV device 110 and connected devices, according to an embodiment. In one example, biometric sensors, motion sensors, sleep sensors, etc. may be used at one location (or the same location in a particular room or rooms) to monitor health and activity of the elderly and notify their family or caretakers as appropriate (remotely or in the same location). Mobile device(s) and speaker device(s) can be used as additional notification output. In one example, the trigger may be the criterion of an out of the ordinary health and daily activities detection (e.g., from a health monitoring app, from normal activities or habits that have not occurred, etc.). In one example, the routine determines whether the criterion is met. If the criterion has not been met, the routine loops back or continues to wait for the criterion to be met. If the criterion is met, actions are determined (e.g., using an action table, such as Table 2A or 2B) and performed (e.g., change the TV device state to wake (if not already in the awake state) and display an alert on the TV device 110 (e.g., front door left open for one hour), display a related alert on a mobile device, and change state of a speaker device (or all speaker devices) and play an alert sound or message).

Figure 22:
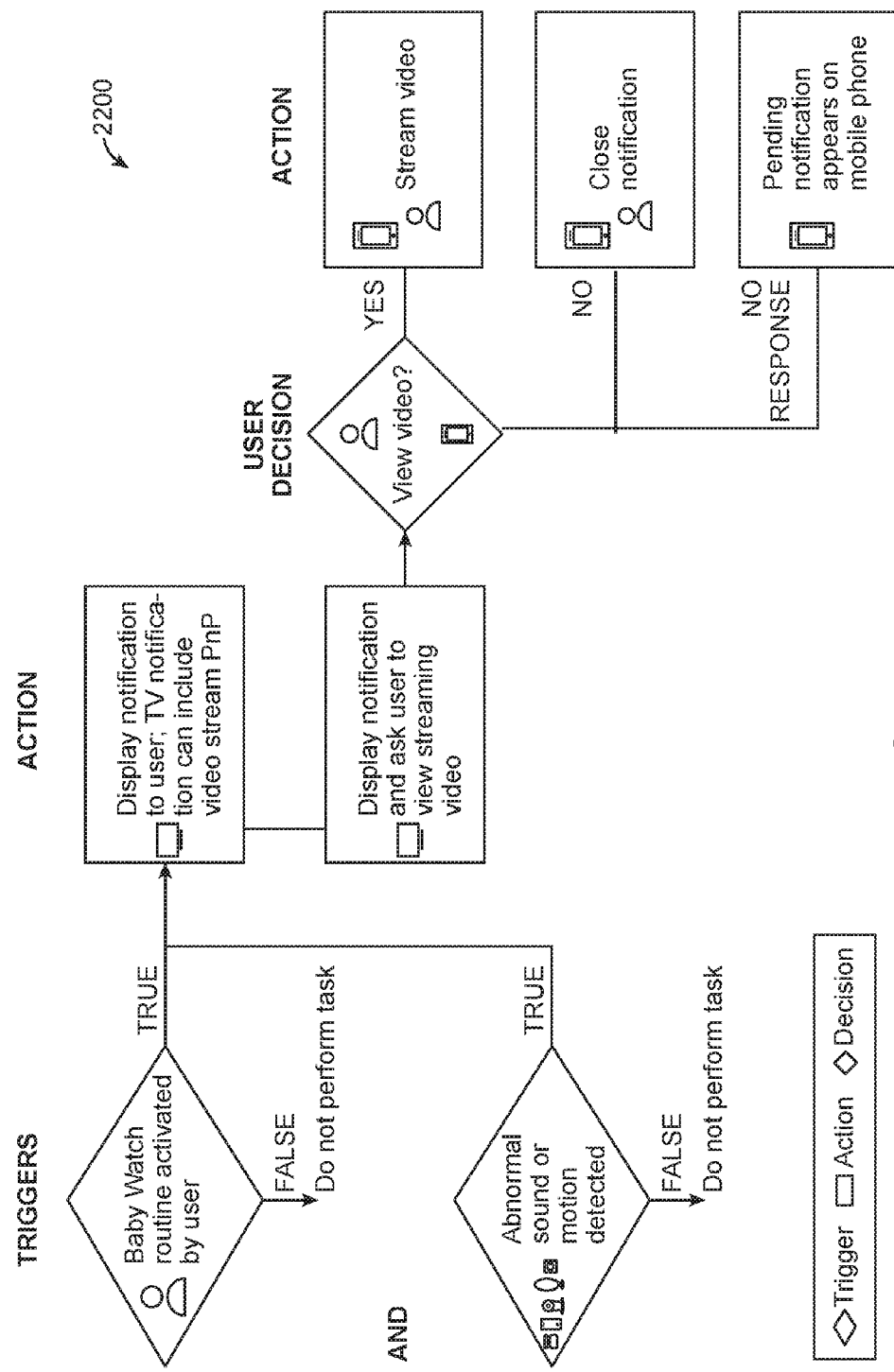
FIG. 22 shows an exemplary flow diagram for a baby watch routine with a TV and connected devices, according to an embodiment.

FIG. 22 shows an exemplary flow diagram 2200 for a baby (invalid, etc.) watch routine with a TV device 110 and connected devices, according to an embodiment. In one example, the speaker's microphone may be used to monitor a baby, toddler, invalid, etc. while sleeping. The microphone of the speaker device may also be used to look for abnormal sounds or silence during play/normal activity and prompt a parent or caretaker to check up on whomever is being monitored as appropriate. In one example, the trigger for the routine may include first criteria for the baby watch routine activated and a second criteria for an abnormal sound or motion detected. In one example, the routine determines whether the first criterion and the second criterion are met. If either the first criterion or the second criterion has not been met, the routine loops back or continues to wait for both the first criterion and the second criterion to be met. If both the first criterion and the second criterion are met, actions are determined (e.g., using an action table, such as Table 2A or 2B) and performed (e.g., change the TV device state to wake (if not already in the awake state) and display a notification, which may include a video stream (if a camera device is employed), display a related alert on a mobile device and request to view streaming video). In one example, the routine determines whether streaming video is requested or not. If streaming video is requested, an action including streaming the video is performed. If streaming video is declined, the notification is closed on the mobile device. If no response is received regarding the streaming video, a pending notification is displayed on the mobile device.

Figure 23:
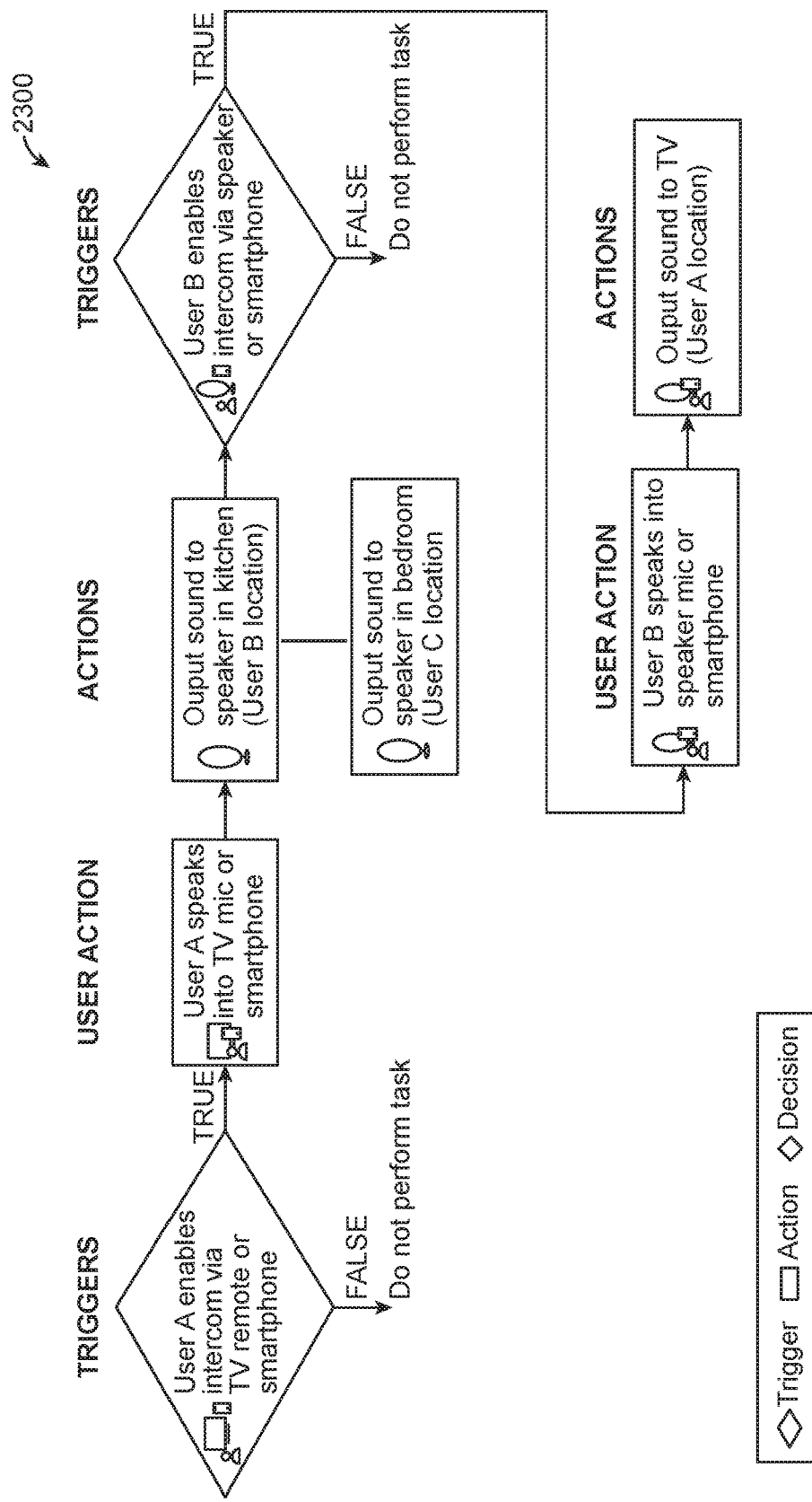
FIG. 23 shows an exemplary flow diagram for an intercom routine with a TV, mobile device and a speaker device, according to an embodiment.

FIG. 23 shows an exemplary flow diagram 2300 for an intercom routine with a TV device 110, a mobile device and a speaker device, according to an embodiment. In one example, an intercom system is manually enabled to all or a selected set of speakers using either the TV device 110 plus a remote or mobile device. In one example, the trigger for the routine may include the first criterion where a first user enables an intercom system via the TV device 110 remote or mobile device, or the second criterion where a second user enables the intercom system via a speaker device or mobile device. In one example, the routine determines whether the first criterion is met. If the first criterion has not been met, the routine loops back or continues to wait for the first criterion to be met. If the first criterion is met, the first user speaks into a TV device 110 microphone or mobile device and actions are determined (e.g., using an action table, such as Tables 2A and 2B) and performed (e.g., output sound to a speaker in a particular location, such as the kitchen (where the second user is located), and output a sound to a speaker in the bedroom (or other location) where a third user is located). In one example, the routine determines whether the second criterion is met or not. If the second criterion is not met, the routine loops back or waits for the second criterion to be met. If the second criterion is met, the second user speaks into the microphone of the speaker or a mobile device and an action is determined and performed (e.g., output sound to the TV device 110 (first user location)).

Figure 24:
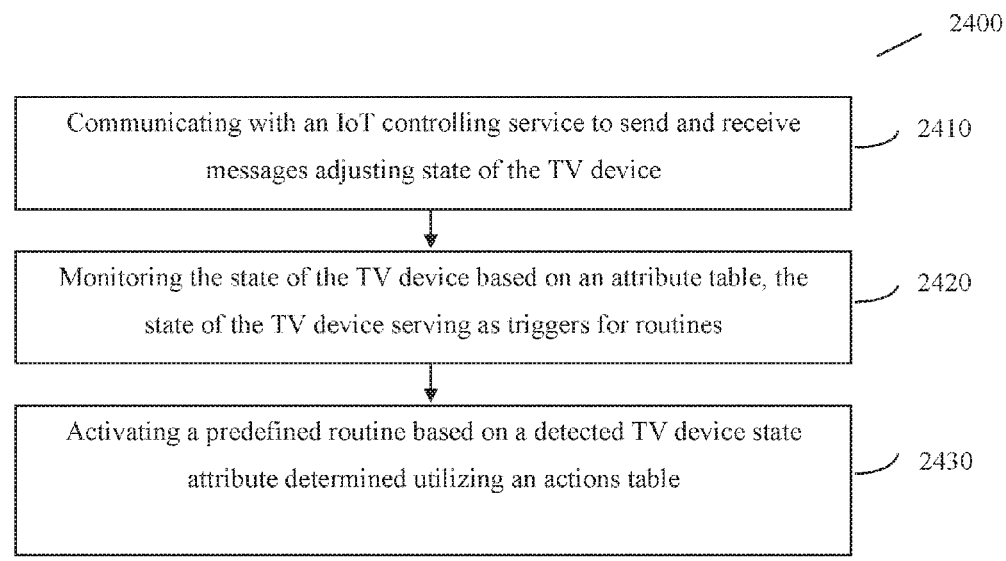
FIG. 24 shows a block diagram for a process for a TV device participating in an IoT network.

FIG. 24 shows a block diagram for a process 2400 for a TV device (e.g., TV device 110, FIG. 1) participating in an IoT network, according to an embodiment. In one example, in block 2410 an IoT controlling service (e.g., IoT controlling service 130) communicates to send and receive messages adjusting state (e.g., sleep, awake, input source, etc.) of the TV device. In block 2420 the state of the TV device is monitored based on an attribute table (e.g., example Table 1), where the state of the TV device serves as triggers for routines (e.g., the example routines as described above). In block 2430 a predefined routine is activated based on a detected TV device state attribute determined utilizing an actions table (e.g., example Table 2).

In one embodiment, process 2400 may include that the predefined routine links a series of actions from the actions table. Process 2400 may further include creating the predefined routine by: displaying available actions (e.g., on the TV device, and/or a mobile device), receiving action selections (e.g., using an interface, such as a remote control, or other device), and combining action selections to create the predefined routine (e.g., from chained action selections). In one example, new routines may be added either through browsing a list of recommended recipes and editing those after selection, or through an on-screen interface that guides the user through a setup process or through voice input. The routines may also be created using a smart phone (e.g., using an app), on a computing device, the TV 110, etc. In another example, icons or other symbols may represent different devices in the IoT network, various users, and different schedules may be applied for selected days and times (repeated or not). The icons or symbols may be selected and placed together (e.g., dragged and dropped, clicked on, selected via voice command, or remote control, etc.) so that a routine is formed from the combination of icons or symbols.

In one example, the predefined routine is limited based on day of week, time of day, or day of week and time of day. The predefined routine performs at least one of: simulating presence, and operating a structure security function. In one example, process 2400 may implement that the predefined routine provides automatic adjusting of display and audio features for the TV device and other connected devices based on content being played. The predefined routine may control the TV operation and features based on at least one other connected device state.

Figure 25:
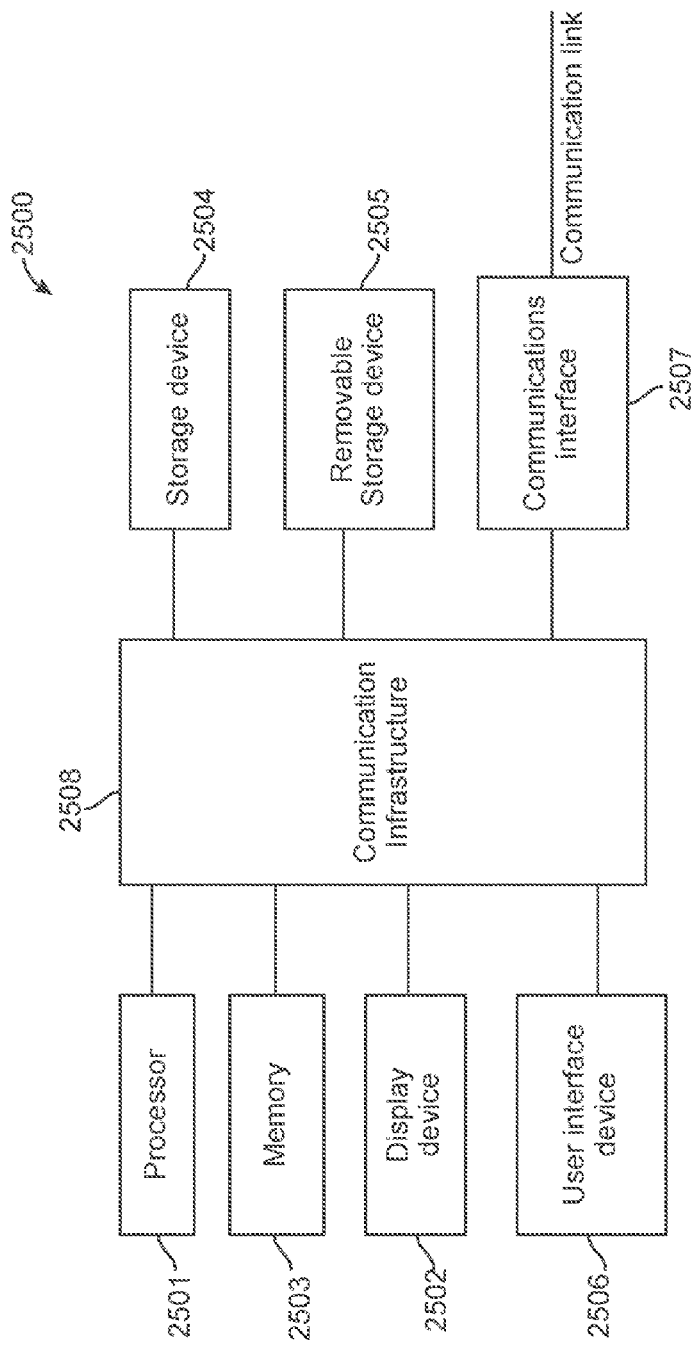
FIG. 25 is a high-level block diagram showing an information processing system comprising a computing system implementing one or more embodiments.

FIG. 25 is a high-level block diagram showing an information processing system comprising a computing system 2500 implementing one or more embodiments. The system 2500 includes one or more processors 2501 (e.g., ASIC, CPU, etc.), and may further include an electronic display device 2502 (for displaying graphics, text, and other data), a main memory 2503 (e.g., random access memory (RAM), cache devices, etc.), storage device 2504 (e.g., hard disk drive), removable storage device 2505 (e.g., removable storage drive, removable memory, a magnetic tape drive, optical disk drive, computer-readable medium having stored therein computer software and/or data), user interface device 2506 (e.g., keyboard, touch screen, keypad, pointing device, remote control), and a communication interface 2507 (e.g., modem, wireless transceiver (such as Wi-Fi, terrestrial microwave, cellular, IEEE 802.16, WIMAX, etc.)), a network interface (such as an Ethernet card), a communications port, or a PCMCIA slot and card).

The communication interface 2507 allows software and data to be transferred between the computer system and external devices through the Internet, a mobile electronic device, a server, a network, etc. The system 2500 further includes a communications infrastructure 2508 (e.g., a communications bus, cross bar, or network) to which the aforementioned devices/interfaces 2501 through 2507 are connected.

The information transferred via communications interface 2507 may be in the form of signals such as electronic, electromagnetic, optical, or other signals capable of being received by communications interface 2507, via a communication link that carries signals and may be implemented using wire or cable, fiber optics, a phone line, a cellular phone link, a radio frequency (RF) link, and/or other communication channels.

In one implementation of one or more embodiments in a TV device, the system 2500 further includes an image capture device, such as a camera, and an audio capture device, such as a microphone. The system 2500 may further include application interfaces as an MMS interface, an SMS interface, an email interface, a social network interface (SNI), an audio/video (AV) player, a web browser, an app interface, a motion detector, etc.

As is known to those skilled in the art, the aforementioned example architectures described above, according to said architectures, can be implemented in many ways, such as program instructions for execution by a processor, as software packages, microcode, as computer program product on computer readable media, as analog/logic circuits, as application specific integrated circuits, as firmware, as consumer electronic devices, AV devices, wireless/wired transmitters, wireless/wired receivers, networks, multi-media devices, as hardware interfaces, etc. Further, embodiments of said Architecture can take the form of an entirely hardware embodiment, an embodiment containing both hardware and software elements, etc.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software package or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for a television (TV) device participating in an Internet of Things (IoT) network comprising:
   communicating, by the TV device, with an IoT controlling service to send and receive messages adjusting a state of the TV device;
   monitoring the state of the TV device based on an attribute table, wherein the state of the TV device triggers one or more routines including actions by one or more electronic devices in the IoT network;
   determining, by the TV device, a predefined routine based on an actions table; and
   activating, by the TV device, the predefined routine based on a detected TV device state attribute.

2. The method of claim 1, wherein the predefined routine comprises linking a series of actions from the actions table to control multiple electronic devices in the IoT network.

3. The method of claim 1, further comprising:
   creating the predefined routine by:
     displaying available actions on the TV device;
     receiving one or more action selections through an interface of the TV device; and
     combining action selections to create the predefined routine of chained action selections.

4. The method of claim 2, wherein the predefined routine is limited by day of week, time of day, or day of week and time of day.

5. The method of claim 2, wherein the predefined routine comprises simulating presence, and operating a structure security function.

6. The method of claim 2, wherein the predefined routine provides automatic adjusting of display and audio features for the TV and other connected devices based on content being played.

7. The method of claim 2, wherein the predefined routine controls the TV operation and features based on at least one other connected device state.

8. A television (TV) device comprising:
   a memory configured to store TV device state attributes and actions; and
   a processor configured to participate in an Internet of Things (IoT) network to perform initiation of actions and routines by one or more electronic devices in the IoT network, the routines based on the stored device state attributes and actions;
   wherein operation states of the TV device are configured to serve as triggers for the actions and routines, and the processor is configured to determine a predefined routine based on the stored actions, and to activate the predefined routine based on a detected TV device state attribute.

9. The TV device of claim 8, wherein the predefined routine comprises a series of linked actions to control multiple electronic devices in the IoT network.

10. The TV device of claim 8, wherein the processor is configured to create the predefined routine by receipt of one or more action selections, and a combination of action selections.

11. The TV device of claim 8, wherein the processor is configured to limit the predefined routine based on a schedule.

12. The TV device of claim 8, wherein the predefined routine comprises simulation of presence or operation of a security function.

13. The TV device of claim 8, wherein the predefined routine is configured to provide automatic adjustment of display and audio features for the TV and other connected devices based on content played.

14. The TV device of claim 8, wherein the predefined routine is configured to control the TV operation and features based on a state of another connected device.

15. A non-transitory computer-readable storage medium embodied thereon instructions being executable by at least one processor to perform a method for a television (TV) device participating in an Internet of Things (IoT) network, the method comprising:
   communicating, by the TV device, with an IoT controlling service to send and receive messages adjusting state of the TV device;
   monitoring the state of the TV device based on an attribute table, wherein the state of the TV device triggers one or more routines including actions by one or more electronic devices in the IoT network;
   determining, by the TV device, a predefined routine based on an actions table; and
   activating, by the TV device, the predefined routine based on a detected TV device state attribute.

16. The non-transitory computer-readable storage medium of claim 15, wherein the predefined routine comprises linking a series of actions from the actions table to control multiple electronic devices in the IoT network.

17. The non-transitory computer-readable storage medium of claim 15, wherein the method further comprising:
   creating the predefined routine by:
      displaying available actions on the TV device;
      receiving one or more action selections through an interface of the TV device; and
      combining action selections to create the predefined routine of chained action selections.

18. The non-transitory computer-readable storage medium of claim 16, wherein the predefined routine is limited to a schedule, and the predefined routine comprises simulating presence or operating a structure security function.

19. The non-transitory computer-readable storage medium of claim 16, wherein the predefined routine provides automatic adjusting of display and audio features for the TV and other connected devices based on content being played.

20. The non-transitory computer-readable storage medium of claim 16, wherein the predefined routine controls the TV operation and features based on at least one other connected device state.

* * * * *